US012296207B2

United States Patent
(12) United States Patent
Leahy et al.

(10) Patent No.: US 12,296,207 B2
(45) Date of Patent: May 13, 2025

(54) SUPPRESSION AND ISOLATION SYSTEM

(71) Applicant: BS&B INNOVATION LIMITED, Limerick (IE)

(72) Inventors: Hughie Leahy, Limerick (IE); Frederick Bergman, Plymouth, MN (US); Geoffrey Brazier, Woodbury, MN (US)

(73) Assignee: BS&B INNOVATIONS LIMITED, Limerick (IE)

( * ) Notice: Subject to any disclaimer, the term of this patent is extended or adjusted under 35 U.S.C. 154(b) by 0 days.

(21) Appl. No.: 15/121,570

(22) PCT Filed: Feb. 27, 2015

(86) PCT No.: PCT/US2015/018008

§ 371 (c)(1),
(2) Date: Aug. 25, 2016

(87) PCT Pub. No.: WO2015/131048

PCT Pub. Date: Sep. 3, 2015

(65) Prior Publication Data

US 2016/0361580 A1 Dec. 15, 2016

Related U.S. Application Data

(60) Provisional application No. 61/966,613, filed on Feb. 27, 2014.

(51) Int. Cl.
*A62C 35/02* (2006.01)
*A62C 3/04* (2006.01)
(Continued)

(52) U.S. Cl.
CPC .............. *A62C 3/04* (2013.01); *A62C 35/023* (2013.01); *A62C 35/13* (2013.01); *A62C 37/08* (2013.01);
(Continued)

(58) Field of Classification Search
CPC ......... A62C 3/04; A62C 35/023; A62C 35/13; A62C 37/08; A62C 37/36; A62C 37/44; A62C 99/0045
(Continued)

(56) References Cited

U.S. PATENT DOCUMENTS 2,783,845 A * 3/1957 Mathisen ............ F16K 17/0446 169/54
3,091,365 A * 5/1963 Horner ..................... A62B 9/00 169/26
(Continued)

FOREIGN PATENT DOCUMENTS

| | | |
|---|---|---|
| CN | 102716581 A | 10/2012 |
| DE | 23 37 891 A1 | 2/1975 |
| WO | WO 90/07373 | 7/1990 |

OTHER PUBLICATIONS

International Search Report from the European Patent Office for International Application No. PCT/US2015/018008 mailed Jul. 21, 2015.

*Primary Examiner* — Chee-Chong Lee
(74) *Attorney, Agent, or Firm* — Finnegan, Henderson, Farabow, Garrett & Dunner LLP

(57) ABSTRACT

The disclosure relates to an explosion suppression system and associated methods, which may include a cannon comprising a barrel and a propellant tank, a suppressant cartridge configured to be inserted into the barrel, and a triggering mechanism positioned between the barrel and propellant tank. The suppressant cartridge may be configured to operatively engage with a propellant source. One or more explosion sensors, which may be of different types, may be included in a system, and an explosion suppression device may be configured to activate when one or more of the sensors indicate an explosion. The disclosure further relates to a lock-out mechanism for an explosion suppression
(Continued)

system, with the lock-out mechanism including a mechanical and/or electrical component. In one embodiment, an actuator may be positioned between a suppressant agent volume and a propellant agent volume of an explosion suppression system.

12 Claims, 13 Drawing Sheets

(51) Int. Cl.

| | |
|---|---|
| ***A62C 35/13*** | (2006.01) |
| ***A62C 37/08*** | (2006.01) |
| ***A62C 37/36*** | (2006.01) |
| ***A62C 37/44*** | (2006.01) |
| ***A62C 99/00*** | (2010.01) |

(52) U.S. Cl.
CPC .............. *A62C 37/36* (2013.01); *A62C 37/44* (2013.01); *A62C 99/0045* (2013.01)

(58) Field of Classification Search
USPC ............................................................ 169/46
See application file for complete search history.

(56) References Cited

U.S. PATENT DOCUMENTS

| | | | | |
|---|---|---|---|---|
| 3,831,682 | A * | 8/1974 | Calcaro | A62C 37/10 169/37 |
| 3,971,443 | A * | 7/1976 | Zenker | A62C 37/12 169/39 |
| 4,248,309 | A * | 2/1981 | Hofle | A62C 3/07 169/14 |
| 4,281,717 | A * | 8/1981 | Williams | A62C 3/00 137/624.14 |
| 4,356,868 | A * | 11/1982 | Bentley | A62C 35/10 118/629 |
| 4,815,694 | A * | 3/1989 | Ferren | A62C 31/00 91/35 |
| 5,052,494 | A | 10/1991 | Larsen | |
| 5,198,611 | A | 3/1993 | Larsen | |
| 5,816,330 | A | 10/1998 | Billiard et al. | |
| 5,826,664 | A | 10/1998 | Richardson | |
| 6,269,746 | B1 * | 8/2001 | Larsen | F42C 15/40 102/200 |

* cited by examiner

SUPPRESSION AND ISOLATION SYSTEM

RELATED MATTERS

This application claims priority to U.S. Provisional Patent Application No. 61/966,613, filed Feb. 27, 2014, the entire contents of which are hereby incorporated by reference.

FIELD OF THE DISCLOSURE

This disclosure generally relates to a system for suppressing, isolating, mitigating and/or preventing an explosion and/or combustion in a protected volume.

BACKGROUND

An explosion or combustion suppression and isolation system may be used to prevent or suppress and/or isolate or mitigate a developing explosion and/or combustion in a protected volume. A protected volume may be, for example, a process enclosure, such as a grain elevator, dust silo, dust collector or any other fully or partially enclosed volume for which explosion and/or combustion suppression or mitigation may be desired. In another example, a protected volume may be a building or structure. The protected volume may contain combustible dust, combustible gases, and/or other explosion- or combustion-prone conditions. The protected volume may be connected to ducting or pipework, which may be used to conduct or direct materials, gas, or other media. Ducting or pipework also may be used to vent or release materials, gas, heat, flame, or media from the system, including from the protected volume. Further, equipment and/or instrumentation may be installed within, connected to, or placed in proximity to, the protected volume, ducting, and/or pipework.

Depending on their specific application, suppression and isolation systems may be governed by a number of standards. Exemplary standards include IFP No. 9, Factory Mutual approval standard 5700, EN 14373 for explosion suppression systems, EN 15089 for explosion isolation systems, and NFPA 69 Standard on Explosion Prevention Systems.

Exemplary suppression devices and systems are disclosed in co-owned U.S. Pat. No. 5,198,611 (titled "Explosion Suppression Device with Intrinsically Safe Circuitry"), U.S. Pat. No. 5,934,381 (titled "Hazard Response Structure"), and U.S. Pat. No. 6,269,746 (titled "Disarm Mechanism for Explosive Equipment"), the entire contents of which are hereby incorporated by reference in their entirety.

In a known suppression system, a Cannon™ is provided. The Cannon™ includes a barrel portion which is attached directly or indirectly to the exterior of a protected volume. A suppressant container or canister is provided within the barrel. The suppressant container includes a suppressant and an explosive charge embedded within the container. The suppressant may be a solid, liquid, or a gas. The suppressant may be sodium bicarbonate. The Cannon™ includes a propellant tank containing a propellant (e.g., a pressurized gas, like nitrogen). A rupturable partition (e.g., a rupture disk) may be placed between the propellant tank and barrel, to keep the propellant and suppressant initially separate. When an explosion is detected within the protected volume (e.g., by use of one or more pressure sensors), the explosive charge is detonated, causing the rupturable partition to be ruptured, releasing the propellant into the suppressant container and forcing the suppressant into the protected volume.

In a known system, the suppressant container is typically a riveted aluminum and stainless steel construction. Rivets are used for the connection of dissimilar materials. The prior known riveted system presents certain drawbacks. For example, a riveted interface may allow materials or contaminants to get into the interface between the suppressant container components. For example, the system or parts of the system may be cleaned with water. Sometimes a pressurized water spray is used. The riveted connection may be weakened by such a cleaning process and cleaning fluids may corrode the aluminum canister components. As another example, aggressive process conditions inside the protected equipment may also weaken the riveted construction and the protected volume. If the construction is weakened, the suppressant itself may escape, or the construction may allow the undesirable ingress of water or other fluids, either of which may reduce the effectiveness of the Cannon™. In light of the foregoing drawbacks in the prior art, it may be desirable to provide hermetic or near-hermetic sealing of a suppressant container and to construct it from corrosion resistant material such as stainless steel, which also may offer additional constructional strength.

In a known suppression system, a knife blade or other cutting element may be provided near the rupturable partition. When the detonator within the suppressant is detonated, the cutting element is driven through the rupturable partition, which allows the propellant to force the suppressant into the protected volume. The prior known system presents the drawback that an explosive charge requires special handling. For example, a suppressant containing an embedded charge may be regulated as a Class 1.4D or 1.4S hazardous good under the United Nations Explosive Hazard Classification System. Therefore, it may be desirable to provide a suppressant without an embedded explosive, so that, e.g., the suppressant canister is not subject to restrictions governing explosives. For example, it may be desirable to embed a self-contained pyrotechnic or gas-generating actuator within the suppressant. Alternatively, it may be desirable to provide an actuator separate from the suppressant or suppressant canister.

An explosion suppression and isolation system may be subject to backpressures exerted on the outlet of a Cannon™ by the protected volume. For example, the protected volume may enclose a process subject to pressure fluctuations, or a developing deflagration in a protected volume may exert a pressure on the outlet of the Cannon™. Such backpressure may slow the release of suppressant or extinguishing agent by countering the energy within the Cannon™ that is normally used to open the Cannon™ outlet. In a known system, such backpressures may be addressed by the use of elaborate spray nozzles for the suppressant (e.g., a perforated dome-shaped tubular arrangement with a domed end) to both diffuse the flow of suppressant and provide some isolation from the effects of back pressure during the early stages of a deflagration. Such nozzles typically require physical separation from the process to prevent the nozzles from becoming blocked with process material, which would render the device unable to release extinguishing agent in a timely or effective manner. Separation from process conditions typically is achieved by having the nozzle "pop out" of a tubular Cannon™ exit arrangement when the Cannon™ is actuated, or by providing an expendable cover that is "blown away" by the flow of suppressant.

In a known suppression system, an explosion sensor may be used to detect an explosion and trigger the suppression system. A known suppression system may use a pressure detector, which may sense the earliest stages of an explosion when the pressure builds in the protected enclosure before rapid flame propagation. Alternatively, a known suppression system may use an optical sensor, pressure transducer, or other sensor to identify an explosion and trigger the suppression system. The prior art has combined two or more explosion sensors in a suppression system, configuring the suppression system to trigger when either sensor indicates the existence of an explosion, or when two pressure sensors indicate an explosion event. In this manner, the prior art has relied on multiple sensors as a failsafe benefit. However, using multiple sensors as a failsafe raises the undesirable risk of a false positive—i.e., triggering the suppression system unnecessarily. Requiring two pressure sensors to indicate an explosion event may benefit suppression system users greatly in avoiding unwanted suppression system activation. One such sensing arrangement is disclosed in co-owned U.S. Pat. No. 5,934,381 (the entire contents of which are hereby incorporated by reference in their entirety). However, it may also be desirable to configure a suppression system to avoid such false positives.

To prevent unwanted firing of the Cannon™ (e.g., during maintenance), a known suppression system may include a disarm mechanism designed to prevent the detonator from detonating. One example of such a disarm mechanism uses a physical mechanical disarm device, positioned between the Cannon™ and the protected volume. Such a physical mechanical disarm device is typically required when a propellant and suppressant are pre-combined in a Cannon™. In a known suppression and isolation system, blocking flanges are temporarily inserted to prevent activation during, e.g., cleaning and maintenance. A microswitch arrangement may be used to alert a system user that the blocking flange is in place. In a known system, however, the blocking flange must be placed at the outlet end of a Cannon™, because the entire Cannon™ is typically pressurized (which represents a danger to users working in proximity thereto).

In a system in which the propellant and suppressant are kept separate—such as the system disclosed in co-owned U.S. Pat. No. 5,198,611 (the entire contents of which are hereby incorporated by reference in their entirety)—a physical mechanical disarm device typically is not required. In such a system, an electrical disarm mechanism may be sufficient. One such electrical disarm mechanism, disclosed in co-owned U.S. Pat. No. 6,269,746 (the entire contents of which are hereby incorporated by reference in their entirety) uses a switch to short-circuit a detonating circuit. It may be desirable to provide a physical mechanical disarm device in addition to an electrical disarm device, both to provide redundant safety and to provide reassurance to a user/operator of a suppression and isolation system.

Another example of an explosion or combustion suppression device may include a suppressant or extinguishant maintained under pressure, similar to commercially available self-contained fire extinguishers. Likewise, a suppression device may include a self-propelling agent, e.g., a suppressant combined with a propellant, or a fluid which flashes from liquid to gas and/or vapor state when the suppressant container is opened. Such devices may suffer the drawback that the device's pressurization or propellant may degrade or diminish over time, or the agent may become undesirably compacted due to long-term pressurization, such that the device must be periodically inspected and/or replaced. To overcome those drawbacks, it may be desirable to provide an unpressurized agent canister or an agent canister without a pressurizing propellant—i.e., a canister with a pure suppressing/extinguishing agent—which may be used with a separate propellant mechanism. Such a pure-agent canister may not have to be inspected or replaced as frequently as the known pressurized or self-propelling canisters. In addition to suppressing explosions or combustions, a pure-agent canister may also be used in a fire extinguishing system or device.

Often, a protected volume houses a process (e.g., a manufacturing or industrial process) that is controlled by a distributed control system ("DCS"). Under the applicable regulations and standards (e.g., North American NFPA and European ATEX standards), such process controllers are not allowed to also control the various safety mechanisms that are used to protect the protected volume. Those regulations and standards have led to a typical situation where each safety mechanism is provided with a separate control/monitor. It may be desirable, however, to provide a system to centrally monitor and control multiple protection systems using a single monitoring/controlling system (albeit separately from the DOS that controls the housed process).

In view of the foregoing, it also may be desirable to provide an explosion or combustion suppression and isolation system, which may protect a protected volume against an explosion, and/or to protect any connected or proximate ducting, pipework, equipment, or instrumentation against an explosion.

The disclosure herein provides a system and associated methods that may achieve one or more advantages over the known systems and methods described above and/or may overcome one or more drawbacks in the known systems and methods described above.

SUMMARY

To overcome one or more of the deficiencies above, provide one or more of the desired advantages above, or to overcome other deficiencies and/or provide other benefits, as embodied and described herein, the disclosure is directed to an explosion suppression system, comprising a Cannon™ having a barrel and a propellant tank, with the propellant tank containing a propellant. A suppressant cartridge containing a suppressant may be configured to be inserted into the barrel. A triggering mechanism may be positioned between the barrel and propellant tank, with the triggering mechanism configured to release propellant from the propellant tank into the barrel and suppressant cartridge when the triggering mechanism is triggered, thereby propelling suppressant from an outlet of the Cannon™.

The disclosure also is directed to a suppressant container for use in a flame or explosion suppression system, comprising a suppressant cartridge. The suppressant cartridge may contain a suppressant including a suppression agent, and may be configured to operatively engage with a propellant source. The suppressant cartridge may be further configured to dispense the suppressant when exposed to a propellant from the propellant source.

The disclosure is still further directed to a suppressant container for use in a flame or explosion suppression system, comprising a suppressant cartridge containing a suppressant including a suppression agent. The suppressant cartridge may be configured to operatively engage with a propellant source, and may be further configured to dispense the suppressant when exposed to a propellant from the propellant source.

The disclosure also is directed to an explosion suppression system, comprising an explosion suppression Cannon™ a first explosion sensor configured to sense an explosion, and a second explosion sensor configured to sense an explosion. The first explosion sensor and second explosion sensor may be selected from the group consisting of pressure sensors, temperature sensors, electromagnetic wave sensors, spark detectors, accelerometers, displacement transducers, and electrical continuity sensors. The first explosion sensor may be a different type of sensor from the second explosion sensor, and the explosion suppression Cannon™ may be configured tri expel a suppressant only when both the first explosion sensor and second explosion sensor both sense one or more conditions indicative of an explosion.

The disclosure is further directed to an explosion suppression system, comprising an explosion suppression device, a first sensor configured to sense a first condition within a protected volume, a second sensor configured to sense a second condition within the protected volume, and a third sensor configured to sense a third condition within the protected volume. The explosion suppression device may be configured to activate when at least the first sensor senses that the first condition indicates an explosion and the second sensor senses that the second condition indicates an explosion.

The disclosure additionally is directed to a lock-out mechanism for an explosion suppression system, comprising an explosion suppression system triggering mechanism, and a lock-out key. The lock-out key may be configured to be inserted into the triggering mechanism, and may be further configured to mechanically prevent the triggering mechanism from being triggered when the lock-out key is inserted into the triggering mechanism. The lock-out key also may be further configured to electrically prevent the triggering mechanism from being triggered when the lock-out key is inserted into the triggering mechanism.

The disclosure is further directed to a method of monitoring and controlling a hybrid protection system for a protected volume, comprising monitoring the condition of a passive explosion response device, monitoring at least one condition within the monitored volume, and controlling the operation of at least one active explosion suppression device when at least one monitored condition indicates the existence of an explosion.

The disclosure also is directed to a method of monitoring and controlling an explosion protection system, comprising sensing a condition of a passive explosion response device, generating a signal as the passive explosion device begins to respond to an explosion but before the passive explosion device has opened, and monitoring the signal.

Additionally, the disclosure is directed to a method of monitoring and controlling a protection system for a protected volume, wherein the protected volume is connected to ducting or pipework. The method comprises providing a first protection device configured to protect the protected volume and connected ducting or pipework against an explosion; providing a second protection device configured to protect the protected volume, connected ducting or pipework, and equipment or instrumentation installed within or connected to said protected volume, connected ducting or pipework against an explosion; providing a central controller; and configuring the central controller to control the operation of the first protection device and the second protection device.

The disclosure also is directed to a method of monitoring a protected volume. The method comprises sensing at least one condition within a protected volume using an analog sensor; outputting an output from the analog sensor corresponding to the at least one condition; recording the output of the analog sensor; and providing a time stamp to record the time of the recorded output of the analog sensor.

In another aspect, the disclosure is directed to an explosion suppression system comprising a suppressant agent volume, a propellant agent volume, and an actuator positioned between the suppressant agent volume and the propellant agent volume.

BRIEF DESCRIPTION OF THE DRAWINGS

The accompanying drawings, which are incorporated in and constitute a part of this specification, illustrate several embodiments and together with the description, serve to explain principles of the disclosure.

DESCRIPTION OF THE EMBODIMENTS

Reference will now be made in detail to the present exemplary embodiments, examples of which are illustrated in the accompanying figures.

Suppression/Isolation System with Triggering Mechanism

Figure 1A:
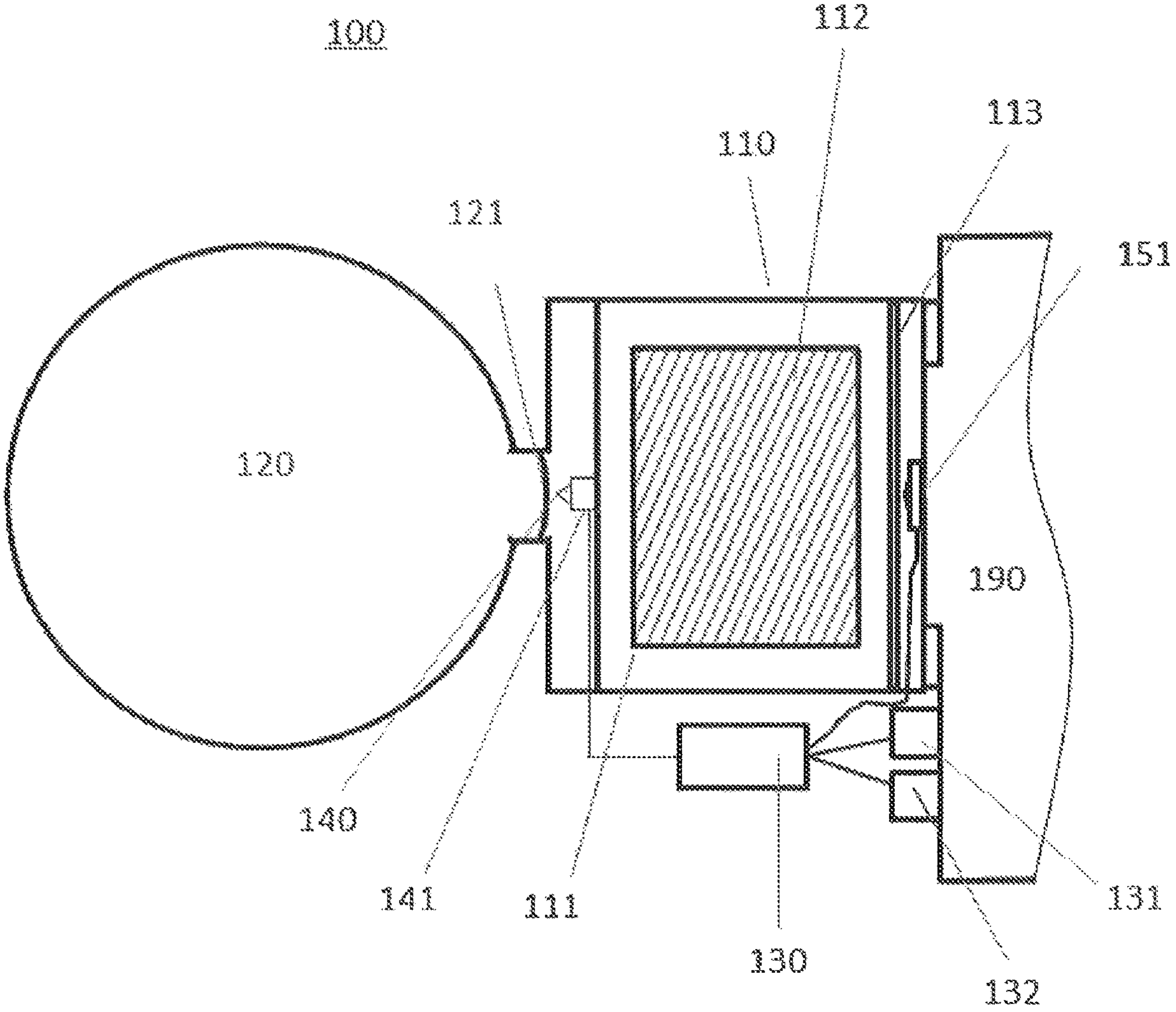
FIG. 1A is an illustration of an explosion suppression system.

In one embodiment, illustrated in FIG. 1A, a pressure suppression and isolation system may include a Cannon™ 100 for injecting a suppression agent 112 into a protected volume. The Cannon™ may include a barrel portion 110 at a first end, which may be attached to an opening in the exterior of the protected volume 190. The opening in the exterior of the protected volume 190 may be sealed by an outlet seal 113, which may be a sacrificial membrane designed to rupture when the Cannon™ 100 is fired (as will be discussed further below). The Cannon™ 100 may be attached to the exterior of a protected volume 190. A suppressant cartridge 111 may be inserted into the barrel 110 and sealed therein.

At a second end of the cannon 100, as illustrated in FIG. 1A, a propellant tank 120, or bottle, may be provided. The propellant tank 120 may be filled with a propellant. The propellant may be a pressurized gas, such as nitrogen, suitable to propel a suppression agent into a protected volume. In one embodiment, an inert gas (e.g., nitrogen or argon) may be used as a propellant; however, any suitable gas may be used. A suitable gas may be selected, e.g., for its stability, non-flammability, and/or non-reactive attributes. An opening of the propellant tank 120 may be attached to an opening in the barrel portion 110 of the Cannon™ 100. A rupturable partition 121 may be included between the opening of the propellant tank 120 and the opening in the barrel portion 110 of the Cannon™ 100. The rupturable partition 121 may be, for example, a rupture disk. The rupturable partition 121 may keep the propellant initially separate from the suppressant 112.

A rupturable partition 121 may be selected based on the driving gas pressure of the propellant, or based on compatibility (e.g., non-reactivity) with the suppressant. For example, the thickness, diameter, and/or material type of a rupturable partition 121 may be varied as desired. Selecting the thickness and/or diameter of the rupturable partition 121 may allow for optimization for a particular driving gas pressure, improving flow area, and/or improving flow rate of the propellant.

As disclosed, the suppressant 112 and propellant may be substantially instantaneously connectible through the use of a triggering mechanism (e.g., the knife blade 140 and knife blade actuator 141 illustrated in FIG. 1A). As illustrated in FIG. 1A, a pressure suppression and isolation system may include a triggering mechanism 140, 141 located entirely within a space between the propellant tank 120 and the suppressant container 111. In such an embodiment, the suppressant container 111 may not include any triggering mechanism (such as, e.g., a detonation charge) within the suppressant container 111, thereby providing the benefits of increased safety and avoiding subjecting the suppressant container 111 to regulations governing explosives. A suppressant container 111 containing pure suppressant is desirable for clean service such as the food and pharmaceutical industries.

As illustrated in FIG. 1A, a knife blade 140 or other cutting element may be provided. The knife blade 140 may be configured to rupture the rupturable partition 121 in the event of a detected explosion in the protected volume 190. By rupturing the rupturable partition 121, the knife blade 140 may cause the release of the propellant, which may force the suppressant 112 into the protected volume 190.

The knife blade 140 may be brought into contact with the rupturable partition 121 by operation of an actuator 141. The actuator 141 may be, for example, a piston, solenoid, electric motor, or piezoelectric motor configured to force the knife blade 140 to rupture the rupturable partition 121. In another embodiment, the actuator 141 may be a pyrotechnic actuator. A pyrotechnic actuator may be selected to be inherently safe—e.g., with no sources of ignition—so that it is not subject to the rigorous regulations applied to classified explosives. For example, in one embodiment, a pyrotechnic actuator may be at least one Metron® actuator. In another embodiment, multiple pyrotechnic actuators (which may be redundant) may be provided. Inherent safety may be particularly desirable for use in combustible environments. The specific actuator may be selected based on the force required to pierce the particular rupturable partition used. For example, if a harder or thicker membrane is used, then a stronger actuator may be required. Thus, the knife blade actuator 141 may be selected or optimized based on the conditions and/or the rupturable partition 121. In another embodiment of a canister release system, the propellant may be released through a normally closed rotatable valve assembly held closed by a pin, latch, shearing member, tensile member, or frangible link that may be caused to fail on demand to release the propellant. A further embodiment of the canister release system comprises an axially moveable valve plug, normally restrained by a pin, latch, shearing member, tensile member or frangible link that may be caused to fail on demand to release the propellant.

Figure 1B:
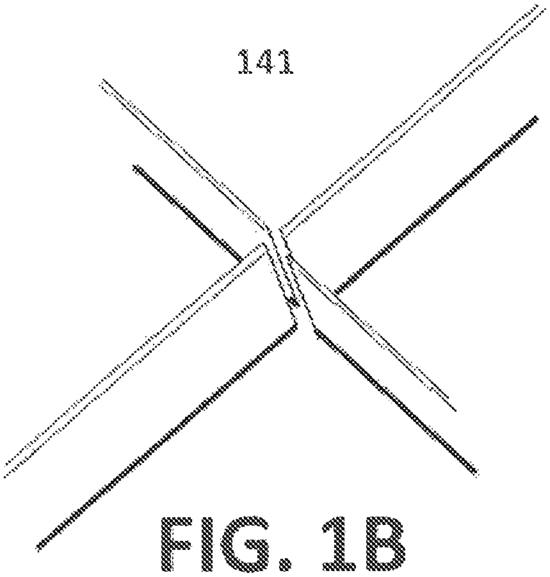
FIGS. 1B-1D illustrate various configurations of a knife blade assembly.
Figure 1C:
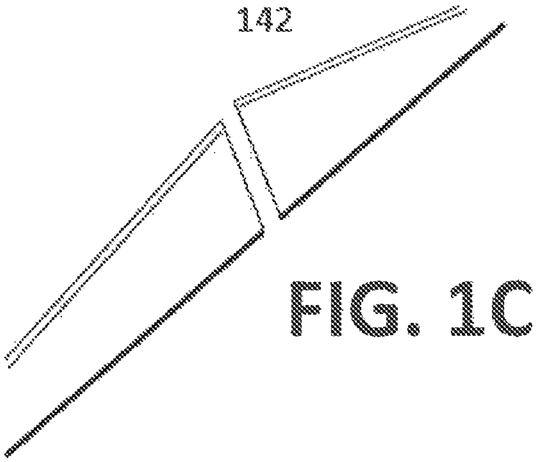
Figure 1D:
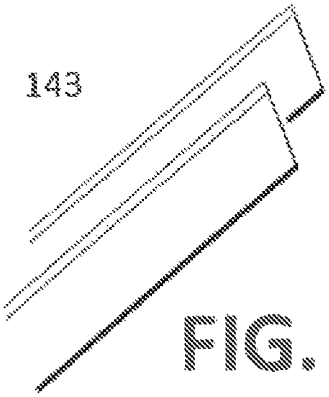

The knife blade 140 may be one of a plurality of knife blades. The knife blade or blades 140 may be arranged in any number of desired ways. The blades 140 may be arranged in various orientations relative to each other, and in various orientations relative to the rupturable partition 121. In one example, illustrated in FIG. 1B, four knife blades 141 may be used and positioned to form an “X” shape. Using a four knife blade arrangement may result in a four-petal opening in a rupturable partition. Such a four-petal opening may direct the flow of propellant through the center of the suppressant container, which may desirably increase the driving force and flow rate. In another example, illustrated in FIG. 1C, one or more knife blades 142 can be arranged to form a sharp point at the center of the rupturable partition. Additionally, or alternatively, one or more knife blades may be oriented parallel to the rupturable partition surface for simultaneous contact. In another embodiment, illustrated in FIG. 1D, two or more knife blades 143 may be provided parallel to each other. By allowing the knife blade (or blades) to be provided in various combinations and/or orientations, the present disclosure may offer improved adaptability.

Returning to FIG. 1A, the suppressant cartridge 111 may be manufactured using a hermetic construction, such as may be achieved by welding on one or both ends. As such, the suppressant cartridge 111 may be pressure rated. A hermetically constructed cartridge may be certified under European and PED directives or North American ASME Code. A hermetically constructed cartridge 111 also may be stored at atmospheric and elevated pressures. By hermetically constructing the suppressant cartridge 111, the contents may be separated from the environment. As such, the suppressant 112 may be protected from contaminants and the environment may be protected from leaking suppressant 112. Hermetic construction may also prevent clumping/caking of the suppressant 112. For example, hermetic construction may keep out moisture that can cause undesirable clumping or caking. Additionally, hermetic construction, particularly when achieved by a welded construction, may enable the cartridge 111 to withstand the forces associated with vibration packing of a suppression agent 112 into the cartridge 111. Using vibration packing may increase the density of suppressant 112 packed in the cartridge 111. Increasing the density of suppressant 112 may ensure uniform concentration of suppressant 112, and may prevent the suppressant 112 from settling in the cartridge 111, which can be detrimental to the dispersal of the suppressant 112.

As illustrated in FIG. 1A, a sealing membrane actuator 151 may be provided to rupture the sealing membrane 113 when the Cannon™ 100 is discharged. Additionally or alternatively, the suppressant 112 may be propelled with sufficient force to rupture the sealing membrane 113 without the use of a sealing membrane actuator 151.

A suppression and isolation system may include an explosion sensor 131, 132 to sense an explosion in the protected volume and to sense when the Cannon™ should be discharged. In the embodiment illustrated in FIG. 1A, a first explosion sensor 131 and a second explosion sensor 132 are provided. The present disclosure contemplates any number of suitable explosion sensors 131, 132. A processor 130 may be used to process a signal from an explosion sensor 131, 132 and determine an appropriate response (e.g., whether to actuate the knife blade 140 and/or the sealing membrane actuator 151). Alternatively, a suppression and isolation system may be used without a processor, such that a signal from one or more explosion sensors may directly trigger a knife blade actuator and/or sealing membrane actuator.

Figure 2:
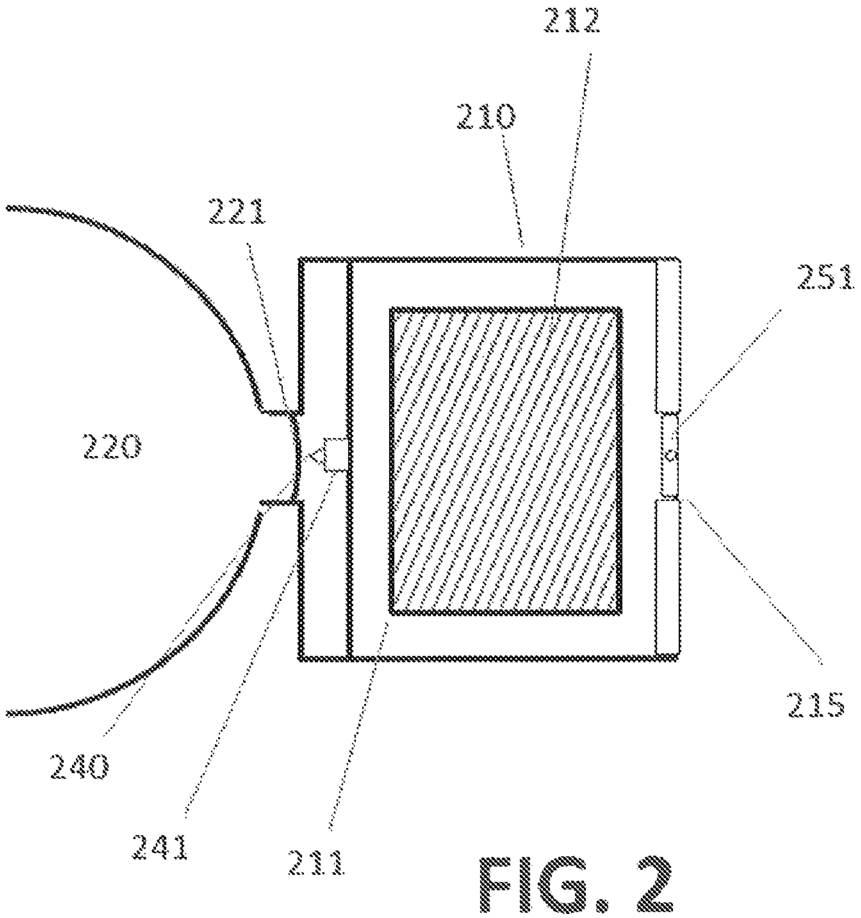
FIG. 2 is an illustration of a Cannon™ including a rotatable valve plug assembly.

In another embodiment, illustrated in FIG. 2, a normally closed valve plug assembly 251 may be provided at the exit 215 of a Cannon™ 200 (i.e., in place of or in addition to the sealing membrane 113 illustrated in FIG. 1A). In such an embodiment, the valve plug 251 may be initially held closed by a pin, latch, shearing member, tensile member, or frangible link that may be caused to fail on demand (or in response to a set pressure applied to the suppressant container 211 by the propellant from the propellant tank 220) to release the suppressant and/or propellant (i.e., after barrier 221 is ruptured via the actuator 240, 241). The valve plug 251 may be a rotating valve plug or an axial valve plug. In one embodiment, the valve plug 251 may be provided with an actuator to open the valve plug 251 and/or to activate a failure member holding the valve plug closed. In another embodiment the valve plug 251 may not include its own actuator. A valve plug 251 without its own actuator may open, e.g., in response to a pressure imparted when the propellant is allowed to enter the suppressant cartridge 211. Exemplary valve plug assemblies that may be used with the present disclosure are disclosed, for example, in co-owned U.S. Pat. Nos. 5,607,140, 5,947,445, 5,984,269, 6,098,495, 6,367,498, 6,488,044, and 6,491,055, and co-owned U.S. patent application Ser. Nos. 13/573,200 and 11/221,856, the entire contents of which are hereby expressly incorporated herein by reference.

Figure 13:
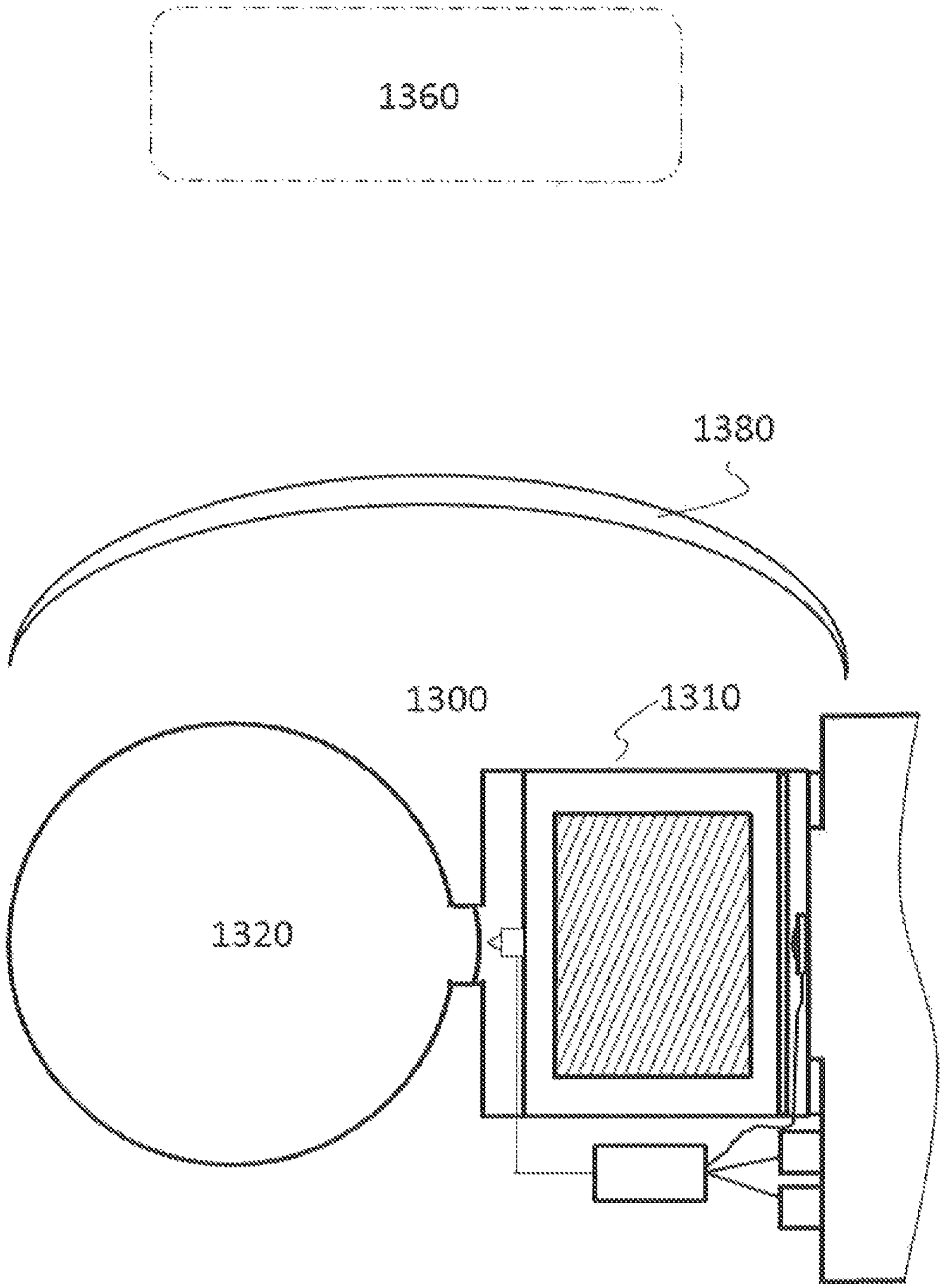
FIG. 13 illustrates a thermal barrier.

In one embodiment, a cannon 1300, which may include a barrel 1310 and propellant tank 1320, may be provided with a thermal barrier 1380, as illustrated in FIG. 13. A thermal barrier 1380 may protect one or more components of the Cannon™ 1300 from ambient heat sources 1360 (including radiant heat sources from processes) that may otherwise be too hot for proximity to the Cannon™ 1300 components. For example, it may be desirable to protect a suppressant agent in barrel 1310 from a nearby heat source 1360. In another example, it may be desirable to protect a propellant, activation mechanisms, electronic components, or any other component(s) of a Cannon™ 1300 from a nearby heat source 1360.

Suppressant Cartridge

Figure 3:
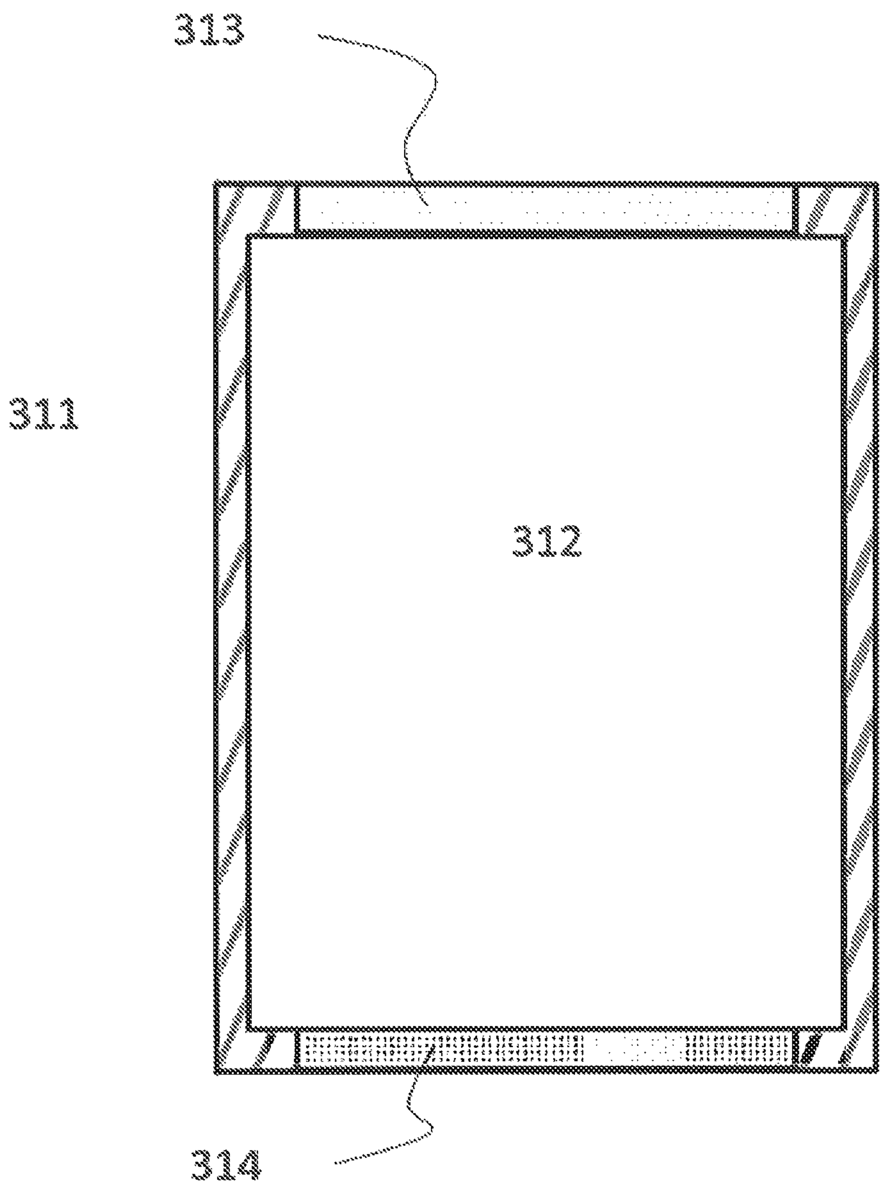
FIG. 3 illustrates a suppressant cartridge.

An embodiment of a suppressant cartridge 311 is illustrated in FIG. 3. A suppressant cartridge 311 may be configured to be inserted into a suppressant container (such as illustrated, e.g., in FIG. 1A). As illustrated in FIG. 3, a suppressant cartridge 311 may be provided with an inlet seal 314 and an outlet seal 313. In one embodiment, the inlet seal 314 and/or outlet seal 313 may be pressure calibrated to burst when propellant is released from the propellant tank, thereby allowing propellant to be injected into the suppressant cartridge and propellant and suppressant 312 to be injected into the protected volume. The inlet seal 314 and/or outlet seal 313 may be provided with one or more lines of weakness—such as a score line or shear line—to facilitate bursting and/or to calibrate the pressure at which the inlet seal may burst.

According to the disclosure, a suppressant cartridge 311 (e.g. as illustrated in FIG. 3) may take the form of a pure-suppressant canister (i.e., with no propellant), which may be non-pressurized. The pure-suppressant canister may contain a dry powder suppressant, such as sodium bicarbonate. Additionally or alternatively, the pure-suppressant cartridge may contain a liquid suppression agent or a combination of dry powders, solids, and/or liquids. Such a pure-suppressant canister may be provided for use with a separate propellant system in an explosion suppression or fire-extinguisher device. Providing a pure-suppressant cartridge may provide benefits. For example, a pure-suppressant cartridge may be cleaner than a known suppressant container that includes a detonator charge therein. Also, a non-pressurized pure-suppressant cartridge may be safer and more stable (e.g., during transport) than a pressurized suppressant container (e.g., as are used in commercially available hand-held fire extinguishers and so called HRD (High Rate Discharge) Suppressors). In addition, whereas a fire extinguisher utilizing a pressurized suppressant container must be periodically inspected and/or replaced to ensure that pressurization remains at a safe and operational level, a non-pressurized pure-suppressant container need not be subject to inspection and/or replacement.

Figure 4:
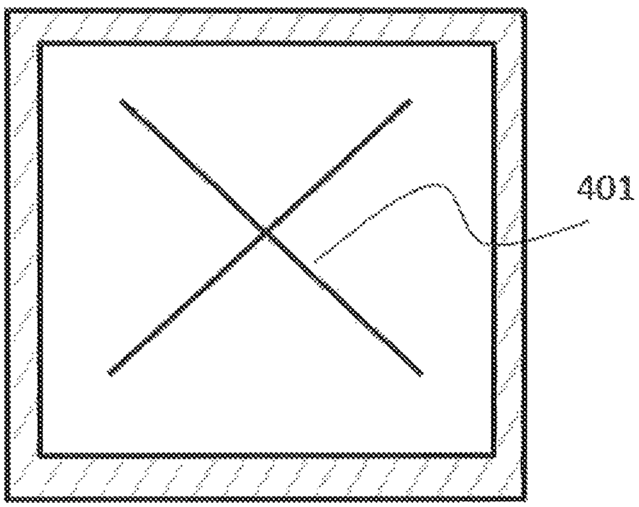
FIGS. 4, 5A, and 5B illustrate lines of weakness for a seal for a suppressant container.

In one embodiment, the inlet and/or outlet seal 314, 313 may be cross-scored via cross-scores 401, as illustrated in FIG. 4. Cross-scoring may facilitate a four-petal opening pattern. When a cross-score 401 is provided in an inlet seal, a multi-petal opening pattern created by a cross-scoring pattern may concentrate the flow of driving gas (i.e., propellant) through the center of the barrel and suppressant cartridge, thereby maximizing the force applied to the suppressant and increasing the speed at which suppressant is injected into the protected volume.

Figure 5A:
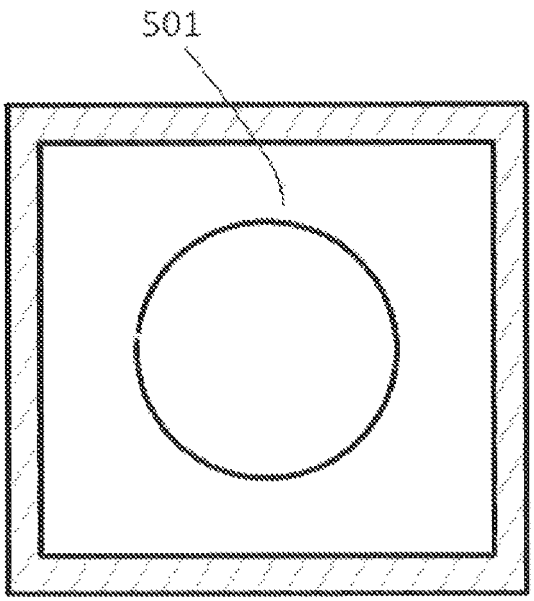
Figure 5B:
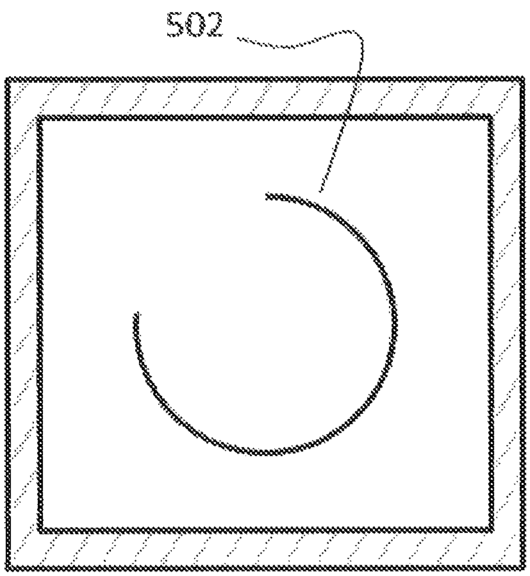

In another embodiment, an inlet and/or outlet seal may be circular 501 or partially circular 502 scored, as illustrated in FIGS. 5A and 5B. When provided with a circular score, a seal may open in a circular pattern. In an embodiment wherein an outlet seal is provided with a circular scoring pattern, the petal from a circular scored outlet seal may fold around an exit nozzle to form a cone shape. In this manner, a circular-scored outlet seal may enhance radial dispersion of the suppressant and may improve suppressant dispersal at lower pressures. A circular score may also increase the available exit area, which may improve flow rate of suppressant and propellant through the cartridge. Different scoring patterns can be deployed to develop desired suppressant dispersal patterns.

Dual-Mode Sensing

It is contemplated that any number of explosion or deflagration sensors (e.g., 131, 132 in FIG. 1A) may be used with the disclosed suppression and isolation system. For example, an explosion sensor may include a pressure threshold sensor. In the event of an explosion in the protected volume, an incipient state rapid rise of pressure—i.e., a pressure wave—may move ahead of the explosion. A pressure threshold sensor may sense an oncoming pressure wave when pressure in the protected volume exceeds a preset threshold. A pressure threshold sensor may be a pressure transducer; however, any suitable pressure threshold sensor may be used. A pressure threshold sensor may sense an absolute pressure. Alternatively, a pressure threshold sensor may sense a differential pressure. A differential pressure sensor may be desired if the protected volume operates at a controlled pressure, which may not necessarily be ambient pressure. By way of non-limiting example, a controlled-pressure system may be designed to operate in a low-pressure environment (e.g., −1 p.s.i.). In an explosion, the controlled pressure of a protected volume may rise (e.g., to 0 p.s.i). A differential pressure sensor may be used to detect such a pressure rise.

In another embodiment, an explosion sensor may include a pressure rate sensor. Because an explosion may be characterized by a steep rate of pressure rise (as opposed to a gradual, pneumatic pressure rise), a pressure rate sensor may be used to detect an explosion when the rate of pressure rise in the protected volume exceeds an allowable rate. A pressure rate sensor may suffer a drawback when the suppression and isolation system is used with a dust application. A dust cloud may not be homogeneous. The non-homogeneity of a dust cloud may cause an irregularly shaped explosion that can thwart a rate-of-pressure measurement.

In yet another embodiment, an explosion sensor may be an electromagnetic (EM) wave sensor. For example, an explosion sensor may be an optical sensor, infrared sensor, or ultraviolet sensor. An explosion may be characterized by a discharge of radiant energy, which may be detected by an EM wave sensor. An EM wave sensor may detect an explosion at a very fast speed, which may be desirable. For an EM wave sensor to operate correctly, however, it must have a clean sensor lens. Accordingly, an EM wave sensor may not be well suited for suppression and isolation systems used with dust applications.

In a further embodiment, an accelerometer or displacement transducer may be provided at the core of an explosion sensor, configured to respond to the changes in loading on the walls of the protected enclosure. Such an accelerometer or displacement sensor may generates a response at an early stage of an explosion, which response may be used to trigger a suppression, isolation or mitigation system. An accelerometer or displacement transducer might be mounted external to the protected enclosure process conditions, avoiding process contact and potential product build up, contamination, or corrosion issues that may impair the function of a more invasive sensor design.

In still another embodiment, an explosion sensor may use a fast-acting temperature sensor, which may sense a rise in temperature accompanying an oncoming explosions. A fast-acting temperature sensor may sense a temperature threshold, or it may sense a rate of temperature rise. A temperature threshold sensor may have a very rapid response time, such as, for example, 1 millisecond.

In another embodiment, an explosion sensor may be a spark detector.

Figure 6A:
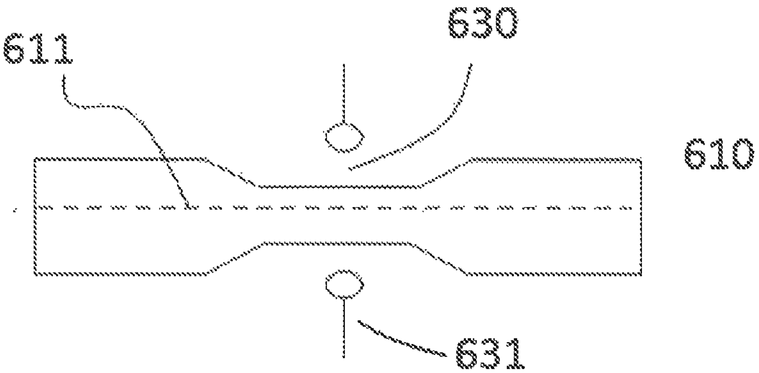
FIG. 6A illustrates an electrical continuity sensor for sensing an explosion.
Figure 6B:
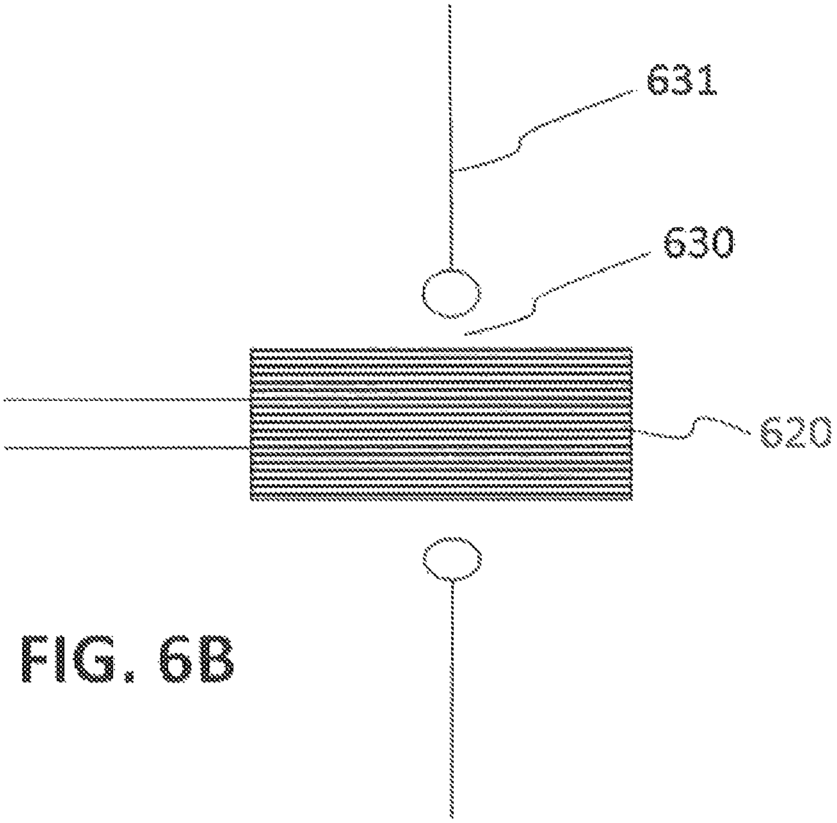
FIG. 6B illustrates a strain gauge for sensing an explosion.

In yet another embodiment, an electrical continuity sensor 610 (as illustrated in FIG. 6A) or a strain gauge 620 (as illustrated in FIG. 6B) may be used to sense an explosion. An example of an electrical continuity sensor 610 or strain gauge 620 is disclosed in co-owned POT Patent Application Pub. No. WO2011/014798 (the entire contents of which are hereby incorporated by reference in their entirety). As illustrated in FIG. 6A, a wire 611 or other conductive component may be installed on a protected volume, with a current passed through it. The wire 611 may be placed across a deformable surface 630 of the protected volume. The deformable surface 630 may be constructed of a deformable material configured to deform when exposed to a predetermined pressure threshold. Alternatively, the deformable surface may be provided with a surface feature (e.g., a score line or other line of weakness 631) designed to open, stretch, tear, or otherwise deform when exposed to a predetermined pressure threshold. When a predetermined pressure threshold is reached, the wire 611 may stretch, which may alter the current passing through it. The change in current may indicate the occurrence of an explosion, and may directly cause an explosion suppression/isolation system to trigger. Alternatively, the change in current may be monitored by a monitor. The monitor may determine whether a change in current indicates an explosion, and the monitor may send a signal to trigger an explosion suppression/isolation system. In another embodiment, the wire 611 may be configured to break when the deformable surface 630 deforms, thereby interrupting an electrical current passing through the wire. Interrupting the current may serve as a signal to trigger an explosion suppression/isolation system.

An explosion sensor may use a combination of multiple sensors. In one example, an explosion sensor may be a combination of multiple sensors of different types, such as a pressure threshold (absolute or differential) sensor paired with another type of sensor (e.g., an infrared or optical sensor, temperature sensor, or pressure-rate-of-rise sensor). A first sensor paired with a second, different type, sensor may provide a mechanism to verify, corroborate, or double-check the status of the first sensor. Different types of explosion sensors may have different (non-overlapping) deficiencies. Therefore, combining two different types of redundant or semi-redundant explosion sensors may provide a beneficial corroboration mechanism, and/or may improve accuracy and/or reliability of a suppression and isolation system.

Figure 7:
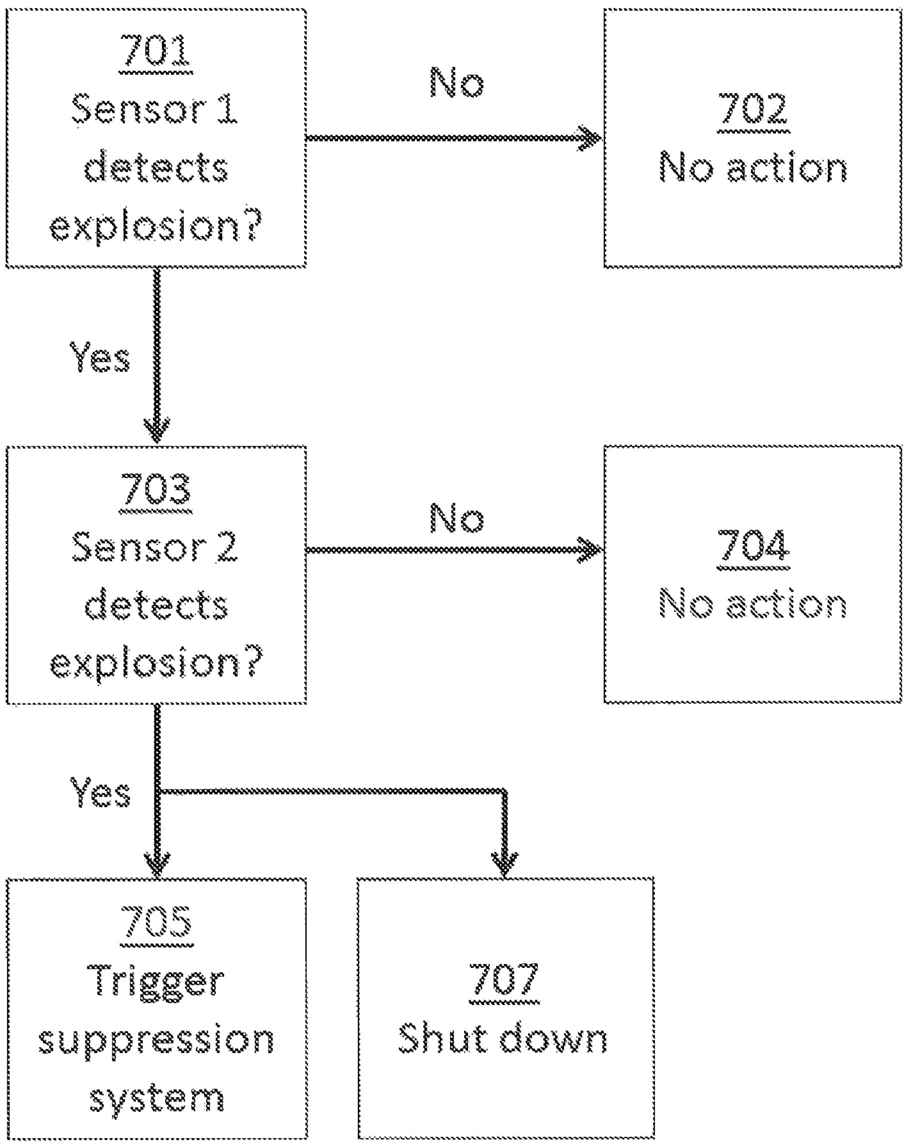
FIG. 7 illustrates a logic flow diagram of one embodiment of a suppression and isolation system.

In one embodiment, as illustrated in FIG. 7, it is contemplated that at least two sensors must sense an explosion or deflagration before the suppression system will be triggered and/or the monitored system will be shut down. For example, if a first sensor (701) detects no explosion, then the suppression system will take no action (702). If a first sensor (701) detects an explosion, but a second sensor (703) detects no explosion, then the suppression system will take no action (704). If a first sensor (702) detects an explosion and a second sensor (703) detects an explosion, then the suppression system may be triggered (705) and/or the monitored system may be shut down (707). In one embodiment, at least two sensors must both sense an explosion or deflagration before the suppression system will be triggered. In one embodiment, at least two sensors must both sense an explosion or deflagration at the same time, substantially simultaneously, or within a short time (e.g., in the range of 1 ms, 10 ms, 100 ms, or 1 s) of each other. Unlike known suppression systems, in which multiple sensors are used as a failsafe (i.e., to ensure triggering if at least one sensor detects an explosion), it is contemplated that the disclosed use of multiple sensors will provide a verification or corroboration mechanism to prevent the suppression system being triggered based on a false-positive detection. In this way, the disclosed embodiment may prevent costly disruptions that may result when a suppression system triggers unnecessarily when certain protected enclosure operating conditions look like an explosion event.

It is contemplated that an existing suppression/isolation system may be retrofitted according to the present disclosure to add the feature wherein at least two sensors must sense an explosion or deflagration before the suppression system will be triggered and/or the monitored system will be shut down. For example, a second (or third or more) type of sensor may be added to a pre-existing suppression system that includes only an optical explosion sensor, and the modified system may be configured to trigger the suppression system only when the preexisting optical sensor and the newly added second type of sensor (e.g., a pressure sensor) both sense conditions indicative of an explosion. In this way, it is contemplated that principles of the disclosure may be adapted to improve pre-existing systems.

In an embodiment in which two or more explosion sensors are used, it is contemplated that a central monitor or processor may be provided to make a decision whether two or more sensors have detected an explosion (and, therefore, whether to trigger the suppression system). Alternatively, it is also contemplated that the two or more explosion sensors may independently signal the existence of an explosion, and the suppression system may be configured to trigger directly (i.e., without the use of an intervening central monitor or processor) in response to an explosion signal from the two or more explosion sensors.

In one embodiment, a pressure threshold sensor may be combined with an EM wave sensor. By combining a pressure threshold sensor and an optical sensor, a suppression and isolation system may benefit from the speed of an optical sensor, and the reliability and robustness of a pressure threshold sensor. For example, if an EM wave sensor is an infrared sensor, it may not be able to distinguish between an explosion and a fire, which may emit similar infrared signals. For that reason, and because a fire and explosion may each require a different response, simple infrared sensing alone may not be sufficient to reliably detect an explosion. A pressure threshold sensor may be able to distinguish between an explosion (which may cause a substantial pressure rise) and a fire (which may not). However, a pressure threshold sensor alone may not be able to distinguish between an explosion and a pneumatic event. Thus, combining an EM sensor, such as an infrared sensor, and a pressure threshold sensor in a suppression and isolation system may allow the pressure threshold sensor and EM sensor to corroborate and verify whether an explosion (or something else, like a fire) has occurred. For example, a system may be configured to require a signal from both an EM sensor and a pressure threshold sensor before determining that an explosion has occurred and taking appropriate responsive measures. A system may be configured to require that the EM sensor and pressure threshold sensor both sense a condition indicative of an explosion at the same time or that both sensors sense such a condition within a set timeframe of each other.

In another embodiment, a single-point temperature threshold sensor may be combined with a pressure threshold sensor. Combining a temperature threshold sensor and a pressure threshold sensor may provide beneficial performance. The single-point temperature threshold sensor may have a rapid response time (e.g., as rapid as 1 millisecond). But simple temperature threshold sensing may not be able to distinguish between a fire and an explosion. For that reason, and because a fire and explosion may each require a different response, simple temperature threshold sensing alone may not be sufficient. A pressure threshold sensor may be able to distinguish between an explosion (which may cause a substantial pressure rise) and a fire (which may not). However, a pressure threshold sensor alone may not be able to distinguish between an explosion and a pneumatic event. Thus, combining a temperature threshold sensor and a pressure threshold sensor in a suppression and isolation system may allow the two types of sensors to corroborate and verify whether an explosion (or something else, like a fire) has occurred.

In one embodiment, multiple pressure sensors may be used along with one or more of a different type of sensor. Co-owned U.S. Pat. No. 5,934,381 (the entire contents of which are hereby incorporated by reference in their entirety) describes and claims a hazard response structure, which may include at least three pressure sensors. The present embodiment contemplates combining the pressure sensors of U.S. Pat. No. 5,934,381 with one or more of a second type of sensor. The second type of sensor may be a temperature sensor, EM sensor, temperature sensor, or other suitable explosion sensor. The second type of sensor may be used to corroborate or verify the status of the other pressure sensors. In one embodiment, the at least three pressure sensors may be used with a two-out-of-three voting logic, such as is described in U.S. Pat. No. 5,934,381, in which at least two of the three pressure sensors must sense a pressure rise before determining whether to introduce a suppressant into the protected volume. The second type of sensor may be used to corroborate or verify that an explosion, sensed by two of three pressure sensors, has actually occurred.

An analog sensor may be used with an explosion suppression/isolation system. Using an analog sensor may allow for direct monitoring of sensor data, in real time, as well as storage of sensor data. Sensor data may be stored via external means. Storing sensor data may allow for the creation of a database of historic readings, which may allow a user to observe changes in the system. Such a database may facilitate improved maintenance of the system and/or analysis of the system. An analog sensor may provide very fast response time. An analog sensor may be calibrated to be very sensitive to a change in condition in the protected volume. An analog sensor may be calibrated very accurately. An analog sensor may permit continuous recording and data collection. In one embodiment, an analog sensor may be used in conjunction with a timer. When used with a timer, an analog sensor may allow a time stamp to be used to record events in the protected volume and/or in the explosion suppression/isolation system. For example, a time stamp may allow a user to determine when an event, such as, for example, an over-pressure event occurred.

In another embodiment, a digital sensor may be used. A digital sensor may provide advantages. For example, a digital sensor may be accurate, fast, reliable, and/or temperature stable.

Figure 8:
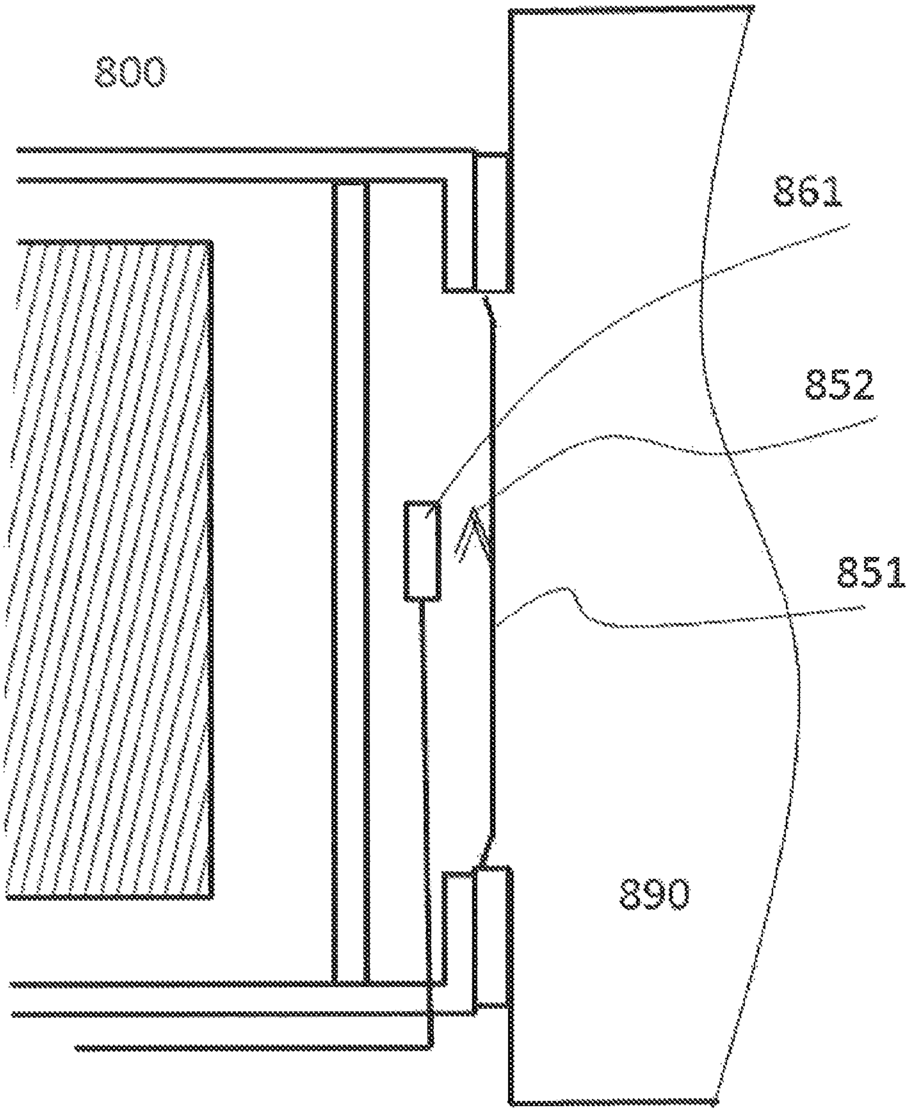
FIG. 8 illustrates an explosion suppression system using a digital sensor with a spring blade.

In one embodiment using a digital sensor, illustrated in FIG. 8, a suppression Cannon™ may be installed on a protected volume 890, with an elastomer diaphragm 851 providing a seal between the Cannon™ 800 and the protected volume 890. The elastomer diaphragm 851 may be a sealed, non-perforated elastomer diaphragm. The elastomer diaphragm 851 may be provided in direct contact with the protected volume 890, so that a change in pressure in the protected volume 890, e.g., may cause the diaphragm 851 to move or flex. A spring blade 852 may be provided adjacent to the diaphragm 851 and configured to be depressed when the sensor diaphragm 851 moves or flexes. The spring blade 852 may also be configured adjacent to an electrical snap-acting switch 861. A set screw (not shown) may be provided to set the spring blade 852. In operation, when the diaphragm 851 moves or flexes in response to a change in condition of the protected volume 890, the spring blade 852 may be forced into contact with the electrical snap-acting switch 861. That contact may cause a signal to be sent, which may activate an explosion suppression/isolation system (e.g., may cause a suppressant to be injected into the system). The arrangement illustrated in FIG. 8 is a very simple design with few moving components; therefore, the risk of component failure may be minimized. Although FIG. 8 illustrates a sensor positioned at, or proximal to, the Cannon™ 800, it is contemplated that principles of the disclosure may be used with an embodiment in which the sensor and Cannon™ 800 are not positioned together.

Figure 9:
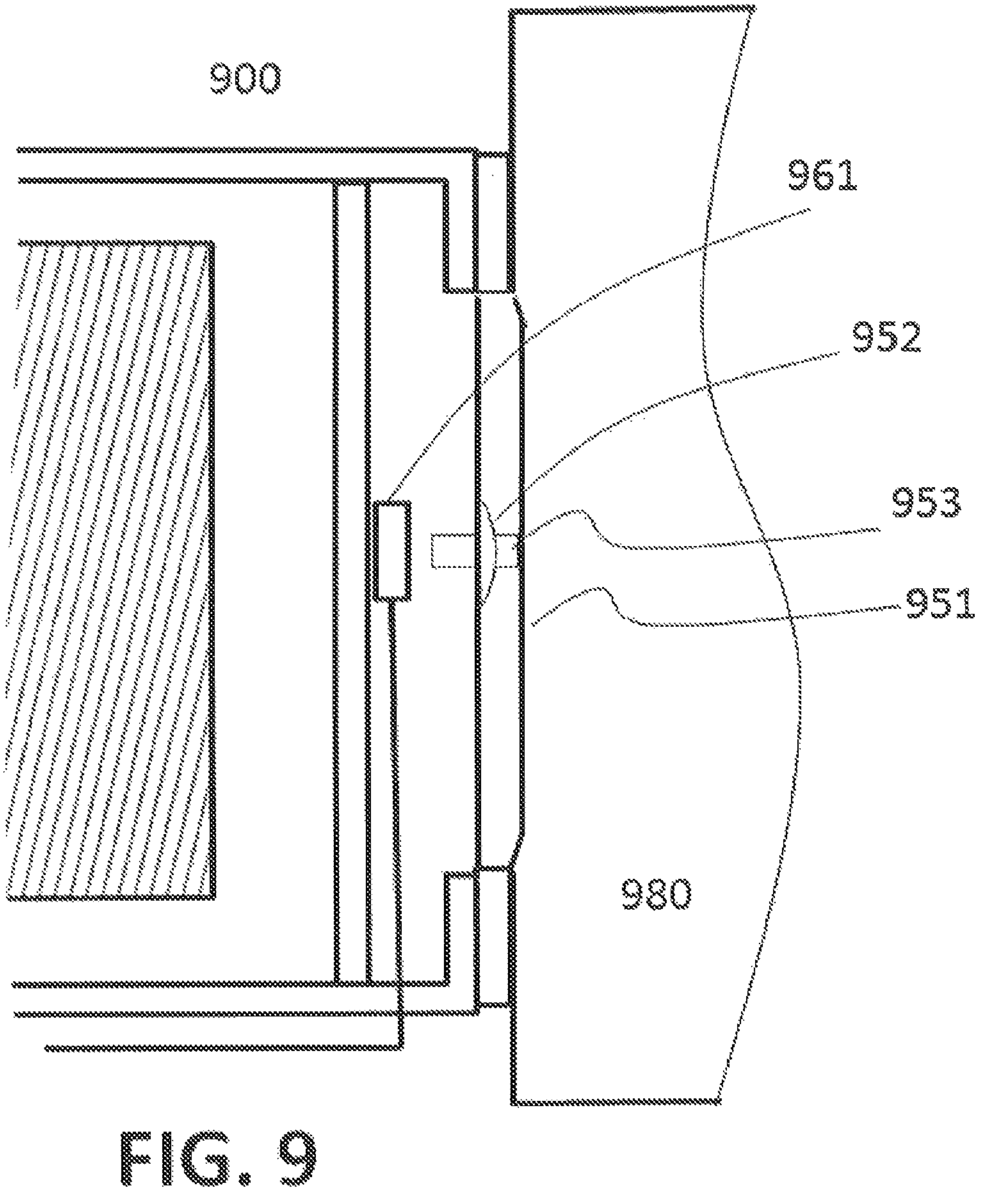
FIG. 9 illustrates an explosion suppression system using a digital sensor sensor with a Clover Dome.

In another embodiment using a digital sensor, illustrated in FIG. 9, a pressure setting mechanism may be used with a diaphragm 951 as a sealing mechanism between a Cannon™ and a protected volume. In one embodiment, the pressure setting mechanism may be a Clover® Dome spring 952, washer, or disk, and the diaphragm 951 may be a Teflon® diaphragm. A rod 953 may be inserted through the center of the Clover® Dome spring 952, thereby placing the Clover® Dome spring 952 into compression so that it forms a domed shape. In compression, a Clover® Dome spring 952 is a bistable device. The size of the rod 953 may control the force required to snap the Clover® Dome spring 952 from one direction to the other. Specifically, increasing rod diameter may increase the force required to "snap through" the washer. Decreasing rod diameter may decrease the force required to "snap through" the washer. Thus, the size of the rod 953 may be used to select a pressure of the protected volume at which the Clover® Dome spring 952 may snap. In operation, a pressure within the protected volume may act on the rupturable partition, which may press against the rod 953. When the pressure within the protected volume reaches a predetermined threshold, the Clover® Dome spring 952 may "snap through" and collapse. When the Clover® Dome spring 952 collapses through, an electrical snap-acting switch 961 may be depressed. Depressing the switch 961 may send a signal to activate the explosion suppression/isolation system. Although a Clover® Dome spring 952 is described, it is also contemplated that a rupture disk, Belleville washer, Belleville spring, or buckling pin may be used. Alternatively, any suitable failure component designed to collapse, fail, or reverse under a predetermined pressure may be used, such that collapse, failure, or reversal may depress an electrical snap-acting switch 961. In one embodiment, the Clover® Dome spring 952, rupture disk, Belleville washer, Belleville spring, buckling pin, or other component may be configured so as not to reset itself after activation. A non-resetting failure component may improve reliability. Requiring replacement after activation may ensure that a properly calibrated and set failure component is used after each activation. In addition, a non-resetting failure component may provide tamper proof features. Although FIG. 9 illustrates a sensor positioned at, or proximal to, the Cannon™, it is contemplated that principles of the disclosure may be used with an embodiment in which the sensor and Cannon™ are not positioned together.

In an embodiment with multiple explosion sensors, a combination of digital and analog sensors may be used. In one embodiment, two digital sensors may be used in combination with one analog sensor. By combining digital and analog sensors, certain "common cause" failure issues may be avoided. For example, if a condition causes one or more analog sensors to fail or behave erratically, one or more digital sensors may provide a verification or check on the analog sensors.

According to the present disclosure, an explosion sensor may be provided with a leak-proof membrane. A leak-proof membrane may be provided with no holes, scores, perforations, or other leak paths or potential leak paths. A leak path can be detrimental to the operation of a sensor and/or explosion suppression and/or explosion isolation system. For example, a leak path may result in a delayed activation, misfiring of a suppression/isolation system, or a general malfunction.

Figure 10:
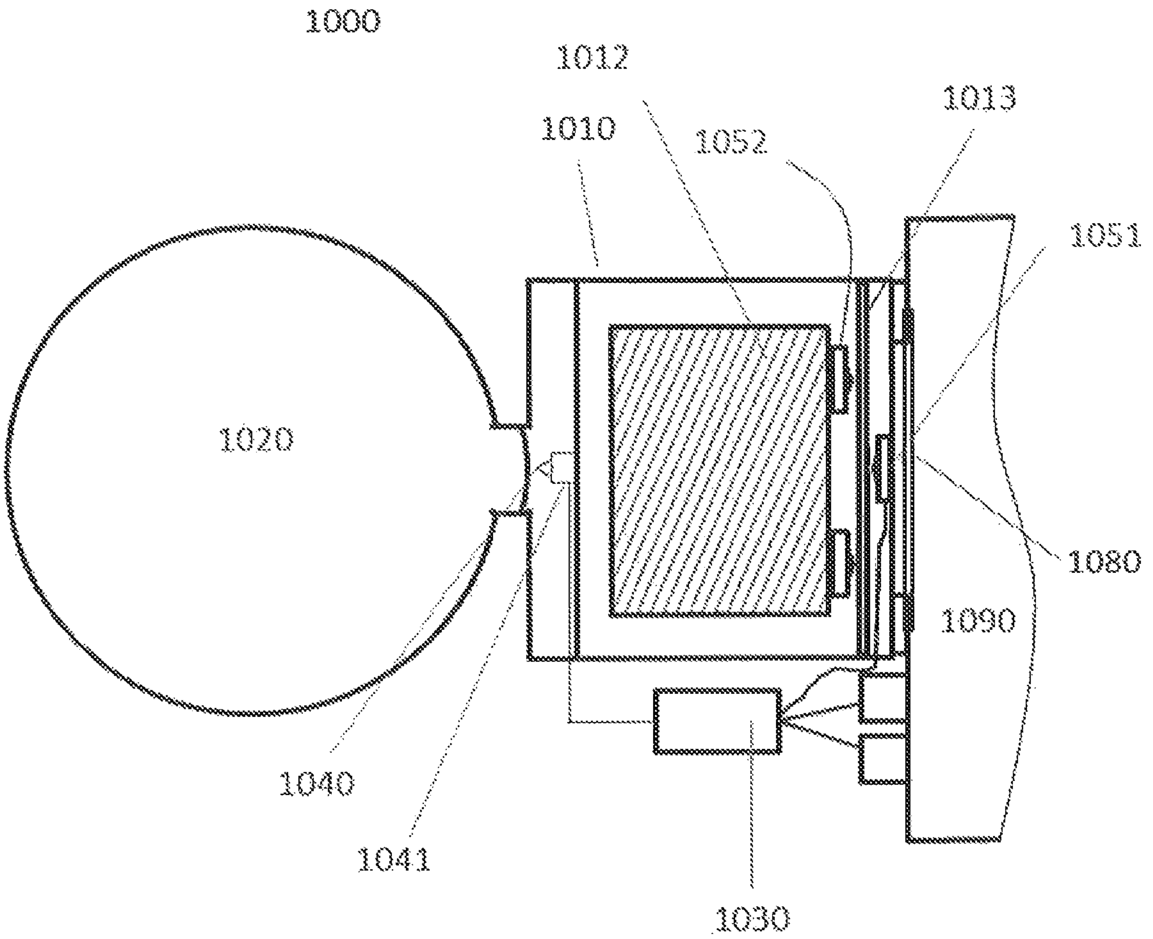
FIG. 10 illustrates an explosion suppression system having a second activation mechanism and a process-end shield.

FIG. 10 illustrates another embodiment according to the present disclosure. Whereas the explosion suppression and isolation system illustrated in FIG. 1A, is depicted as having a single sealing membrane actuator 151, the disclosure is not limited to such a configuration. Accordingly, as illustrated in FIG. 10, one or more additional activation mechanisms 1052 may be used at the process-end of the Cannon™ 1000, in addition to a first activation mechanism 1051. The additional activation mechanism 1052 may be used for the purpose of expediting release of extinguishing agent 1012 into the process enclosure 1090. In one embodiment, a processor 1030 may determine based on a characteristic of a sensed explosion whether one or both of the activation mechanisms 1051, 1052 should be activated, as well as the timing or sequence of such activation. The additional activation mechanism 1052 may be positioned inside or outside the suppressant container 1010. The additional activation mechanism 1052 may be used in conjunction with the triggering mechanism 1040, 1041 employed to open the propellant tank 1020. The additional activation mechanism 1052 may be any device capable of directly or indirectly opening the process end of the Cannon™ 1000, such as by weakening or rupturing the outlet seal 1013 of the suppressant container 1010. In one embodiment, an additional activation mechanism 1052 may mechanically engage or cut the outlet seal 1013. In another embodiment, an additional activation mechanism 1052 may generate a pressure pulse acting on the outlet seal 1013. An additional activation mechanism 1052 may be a pyrotechnic or non-pyrotechnic device, such as, e.g., a gas generator, actuator, or fast-acting solenoid. It is contemplated that an additional activation mechanism 1052 may use a combination of mechanisms to open the outlet seal 1013—e.g., both mechanical engagement with the outlet seal 1013 and a pressure pulse acting on the outlet seal 1013. It is contemplated that the first activation mechanism 1051 may use a different type of mechanism than the additional activation mechanism 1052. By way of non-limiting example, the first activation mechanism 1051 may use a pyrotechnic device while the additional activation mechanism 1052 may use a non-pyrotechnic device. Using different mechanisms for the activation mechanisms 1051, 1052 may provide important advantages in redundancy and failsafe performance, or may provide advantages in allowing the operator to tailor the precise means employed to open an outlet seal 1013 depending on expected or observed conditions.

When the additional activation mechanism 1052 is used to weaken or rupture the outlet seal 1013, the suppressant 1012 may be able to discharge into the protected enclosure 1090 without requiring all or some of the force from the propellant 1020 to open the outlet seal 1013. The timing for the additional activation mechanism 1052 to act on the outlet seal 1013 may be simultaneous or delayed or prior to when the triggering mechanism 1040, 1041 is triggered to release the propellant. The timing of the additional activation mechanism 1052 may be configured to create a pressure differential across the suppressant 1012, which may allow the suppressant to be rapidly discharged from the container 1010 without requiring the force (or without the full force) from the propellant/suppressant acting against the outlet seal 1013 to allow it to open. That is, the additional activation mechanism 1052 may open the outlet seal 1013 instead of or in combination with the propellant 1020. This configuration may offer an improved initial mass flow rate for the suppressant 1012, because a reduced amount of propellant energy may be consumed in opening the outlet seal 1013.

As also shown in FIG. 10, a shielding mechanism 1080 may be positioned on the downstream side (i.e., process side) of the suppressant container 1010. In one embodiment, the shielding mechanism 1080 may be a metallic or non-metallic membrane. The shielding mechanism 1080 may or may not be provided with a line of weakness (e.g., an indentation, score line, shear line, or other line of weakness). A shielding mechanism 1080 may shield the suppressant container 1010 from pressures generated in the protected volume 1090 (i.e., backpressure). Such pressures may be, e.g., the operating pressure generated by a process in the protected volume. Or such pressures may be due to a developing deflagration or explosion.

The shielding mechanism 1080 may provide a complete separation from backpressure, including from the incipient stages of a deflagration, which may ensure that the outlet seal 1013 can open at its designated set-pressure, because a shielding mechanism 1080 may prevent the outlet seal 1013 from having to overcome the additional force acting on its process or downstream side due to backpressures. With the shielding mechanism 1080 in position, the suppressant container 1010 may open as though its outlet seal 1013 is always at or close to atmospheric pressure on the outlet side. Such a configuration may allow for faster opening of the suppressant container 1010 and, hence, faster discharge of the suppressant 1012.

Figure 11:
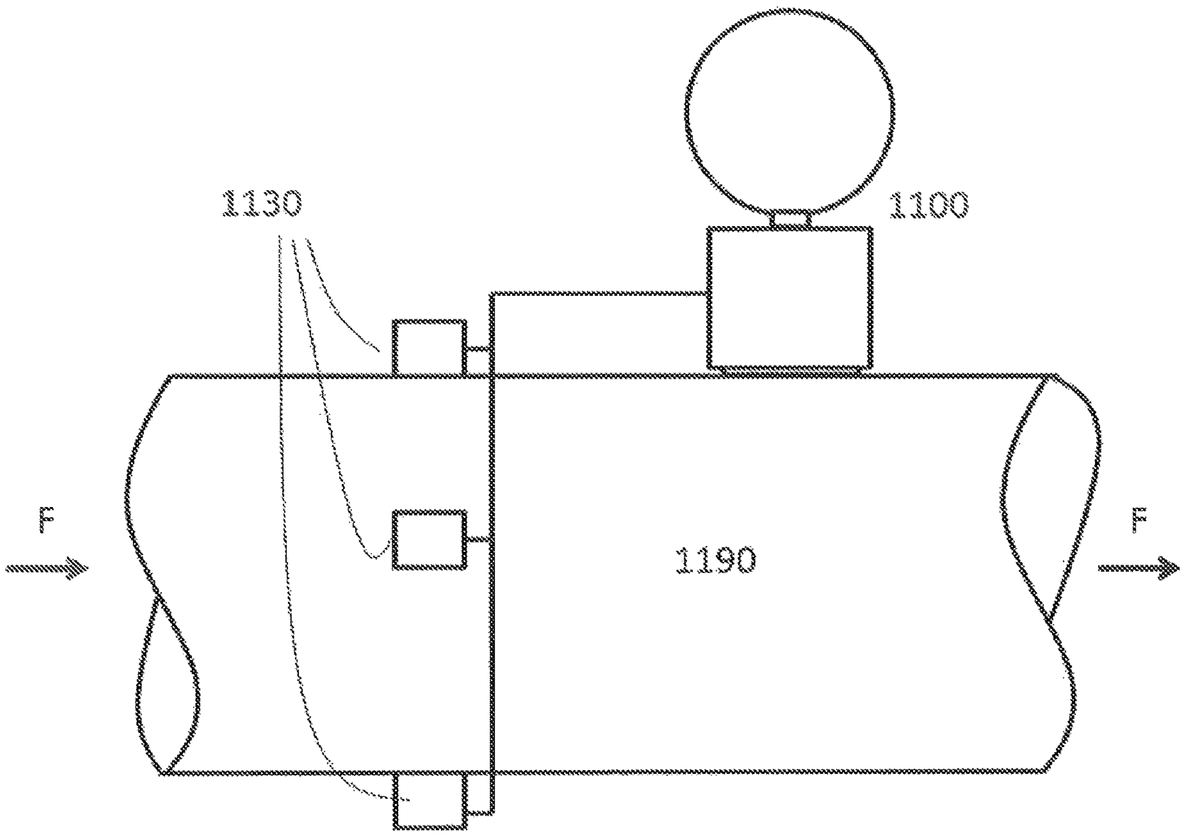
FIG. 11 illustrates an explosion suppression system using at least three sensors.

FIG. 11 illustrates another embodiment according to the present disclosure. As illustrated in FIG. 11, a Cannon™ 1100 may be attached to a protected volume 1190. Three explosion sensors 1130 are positioned at different places around the protected volume. Unlike the system described and claimed in U.S. Pat. No. 5,934,381, the three explosion sensors 1130 in FIG. 11 are not co-located on a single sensor mounting structure. Instead, each of the three explosion sensors 1130 in FIG. 11 are mounted at different parts of the protected volume 1190. As illustrated in FIG. 11, the protected volume 1190 may be a section of pipe or other structure in which materials (gas, dust, etc.) predominantly travel in a flow direction F. As illustrated in FIG. 11, the three explosion sensors 1130 may be positioned at three different co-linear locations perpendicular to the direction of the flow. In another embodiment, one or more explosion sensors may be positioned down-flow from one or more of the other sensors. Although three sensors 1130 are shown in FIG. 11, the present disclosure also contemplates that two or more than three sensors may be used.

The three explosion sensors 1130 in FIG. 11 may be any type of explosion sensor, such as pressure sensors, EM wave sensors, or temperature sensors, or any desired combination thereof. As noted above, it may be desirable to combine different types of sensors.

Each of the three explosion sensors 1130 in FIG. 11 may be used to corroborate or verify the status of the other explosion sensors. In one embodiment, a two-out-of-three voting logic may be employed with the three sensors. Using that logic, a suppression Cannon™ will be fired only when at least two out of the three sensors detect an explosion. The two-out-of-three voting logic may prevent or reduce the likelihood of a false positive explosion detection, which could be caused, for example, by a projectile impacting one of the sensors or a malfunctioning of one of the sensors.

Benefits may be provided by separating the three sensors 1130 from each other as illustrated in FIG. 11. Separating the three sensors from each other may reduce the likelihood of a single projectile impacting multiple sensors. Additionally or alternatively, each of the three sensors 1130 may focus on a different portion of the protected volume. By sensing multiple portions of the protected volume, a suppression and isolation system may reduce the likelihood of failing to detect an irregularly shaped explosion or pressure wave. In an embodiment including multiple sensors 1130, two or more of the multiple sensors may be mounted along a single spatial plane. In another embodiment, two or more of the multiple sensors 1130 may be installed as part of a single unit. In an embodiment where two or more of the multiple sensors 1130 are installed as part of a single unit, each sensor on the single unit may be provided with a different orientation. The arrangement of sensors 1130 in a multiple-sensor embodiment may be selected to reduce the risk of activation due to vibration in the system. Additionally or alternatively, the arrangement of sensors 1130 in a multiple-sensor embodiment may be selected based on the environment in which it is installed. For example, if multiple sensors 1130 are installed in a combustible gas application, they may have an optimal arrangement different from an installation in a combustible dust application.

In one embodiment, a sensor or system of sensors 1130 may be mounted directly on the protected volume, or on a barrier of a protected volume. By mounting a sensor or system of sensors 1130 directly on the protected volume, response time may be minimized, and the sensor or sensor system 1130 may respond in near real-time to changes in the protected volume. A logic system is not required for the suppression/isolation system to take action. By the proximity and/or lack of a logic system, a sensor or system of sensors may reduce the time required for the system to interpret the sensor data and take action (i.e., inject a suppressant into the protected volume if warranted).

Lock-Out Mechanism

Figure 12:
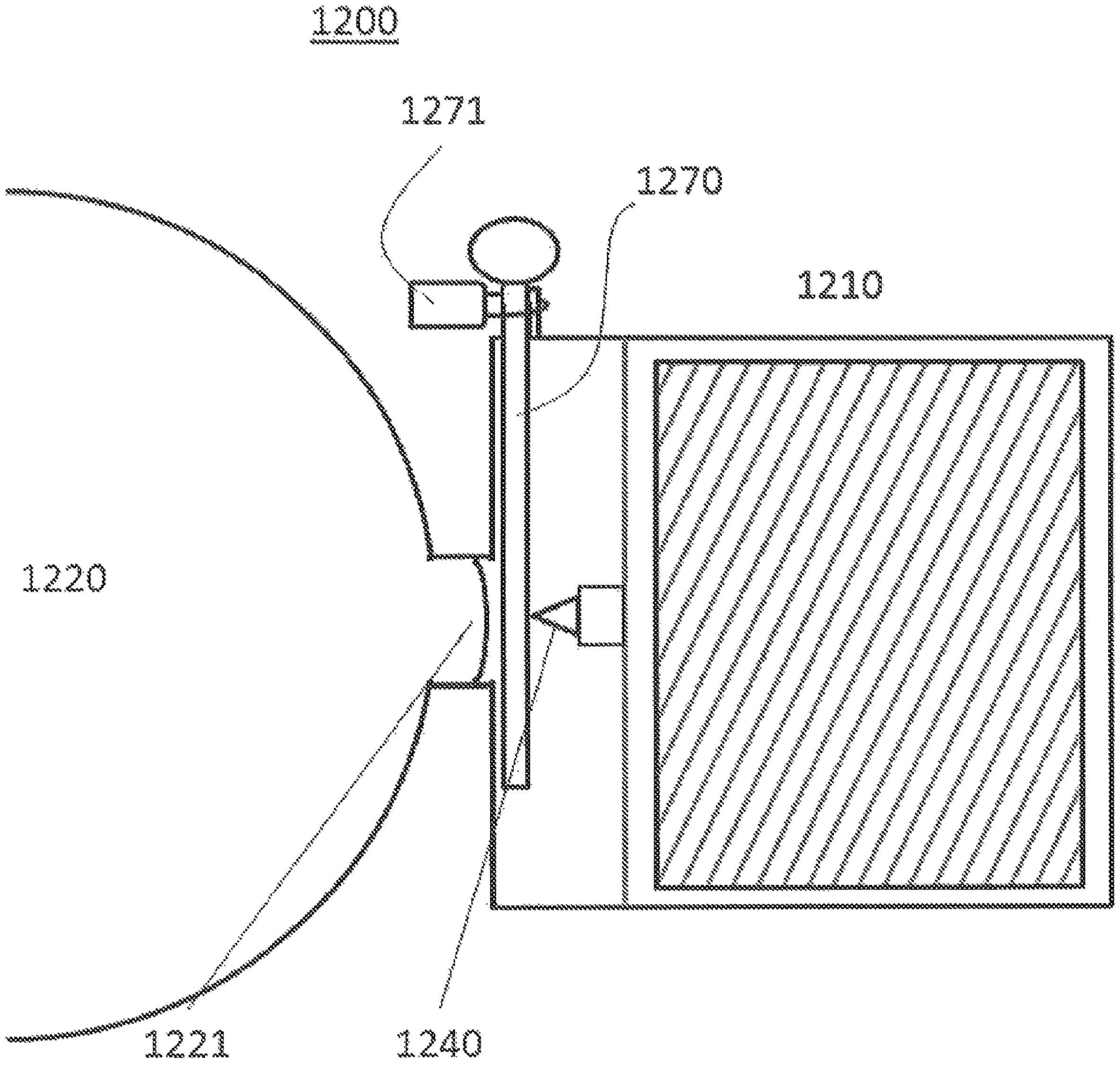
FIG. 12 illustrates an explosion suppression system using a mechanical lock.

FIG. 12 illustrates another embodiment according to the present disclosure. As illustrated in FIG. 12, a Cannon™ 1200 may be provided with a barrel 1210 and a propellant tank 1220, with a rupturable partition 1221 provided between the barrel 1210 and the propellant tank 1220. A triggering mechanism 1240 may be aligned with the rupturable partition 1221. As illustrated in FIG. 12, the triggering mechanism 1240 may include a knife blade and a knife blade actuator. As illustrated, the knife blade may be configured to rupture the rupturable partition when the actuator actuates, thereby releasing the propellant into the suppressant and forcing the suppressant into a protected volume (not shown) to suppress and/or isolate an explosion.

As further shown in FIG. 12, a lock-out mechanism may be provided to prevent accidental firing of the suppression and isolation system. The lock-out mechanism may include a mechanical lock-out mechanism, which may include one or more keys 1270 that can be inserted between the triggering mechanism (e.g., the knife illustrated in FIG. 12) and the rupturable partition to keep the triggering mechanism from releasing the propellant. The key 1270 may take the form of a rod or bar. In one embodiment, a lock-out key 1270 may be inserted through an opening in a normally capped flange. The cap may be removed from the flange, creating an opening into which the lock-out key 1270 may slide to prevent triggering of the triggering mechanism. It is also contemplated that the lock-out key 1270 may be threaded and may thread into a threaded opening of the normally closed flange. An embodiment in which the lock-out key 1270 is threaded may provide an additional level of safety, preventing the lock-out key 1270 from inadvertently becoming dislodged. The lock-out key 1270 also may be provided with features (e.g., grooves, such as typically are found in a door key) to ensure that only the proper lock-out key may be inserted.

In one embodiment, a lock-out mechanism may be provided with a "lockout-tagout tag" 1271. The lockout-tagout tag 1271 may be, for example, a padlock or other mechanism, which may be used to demonstrate to a system user that the propellant in the propellant tank 1220 has been safely or securely "locked out." In addition, the lockout-tagout tag 1271 may provide an additional layer of safety by preventing the lock-out key 1270 from being removed except by authorized personnel (e.g., personnel possessing a key, code, or credentials capable of unlocking the lockout-tagout tag 1271).

In one embodiment, a mechanical lock-out mechanism may be combined with an electrical lockout mechanism. The electrical lockout system may short-circuit the triggering mechanism, thereby providing an additional level of protection against inadvertent triggering. In one embodiment, the electrical lockout system may short-circuit the actuator in a manner similar to that described in co-owned U.S. Pat. No. 6,269,746 (the entire contents of which are hereby incorporated by reference in their entirety). The lockout mechanism may, in one embodiment, provide a user alarm or notification at a monitor, to indicate that the lockout mechanism is engaged. By combining a mechanical lock with an electrical lockout system, redundant safety may be provided, and user/operator peace of mind may be increased.

Combined Monitoring and Control System

An explosion suppression and isolation system may be used as part of a broader network of safety features used with a protected volume. For example, a protected volume may include a variety of active monitoring and/or safety components, such as a suppression and isolation system, a spark detection system, a pinch valve, an active flap valve, and/or other systems for detecting and responding to an emergency condition (e.g., flame or explosion) within a protected volume. As used in the prior art, however, each such safety component includes its own separate controller—i.e., there is a need for a control system capable of controlling and coordinating multiple safety features used with a single protected volume. The present disclosure provides such a control system. In addition or alternatively, a system may include one or more passive protection/safety devices (such as, e.g., vents or flameless vents). The present disclosure provides a system that may monitor such passive protection/safety devices, whether or not combined with an active monitoring and/or safety component.

According to the present disclosure, a safety monitoring and control system is configured to monitor and control two or more types of monitoring and/or safety systems. For example, it is contemplated that a single central monitoring and control system may be used to monitor and control any combination of, e.g., the following systems: (1) a suppression system, such as previously known or as depicted in any of FIGS. 1-11, above; (2) a spark detection system, which may be configured to detect a source of infrared radiation or increased temperature (e.g., a spark); (3) a spark detection and extinguishing system, which may be configured to extinguish a spark (e.g., through use of a coolant or extinguishant) detected within a protected volume; (4) a mechanical suppression/isolation system, which may include a mechanical shutoff to prevent an explosion from traveling or propagating throughout the protected volume (such as, e.g., a fast-acting shutoff valve, a pinch valve, or a knife-gate valve); and/or (5) a passive safety device/mechanism such as, e.g., a vent or a flameless vent. The two or more types of monitoring and/or control systems, as well as the various protection devices described above, may be configured to provide explosion protection for a protected volume, connected ducting or pipework, and/or equipment or instrumentation installed within or connected to a protected volume, ducting, or pipework. In one embodiment, separate protection devices may be used to protect different portions of the system, protected volume, ducting, pipework, equipment and/or instrumentation.

A combined monitoring and control system according to the present disclosure may be provided with a very fast communication and response mechanism. For example, the combined monitoring and control system may be able to communicate a response within one or more microseconds or milliseconds between different explosion protection devices resulting in deployment of more than one response. Unlike known fire-suppression systems, in which responses need not be particularly fast (and need not be automatic), an explosion suppression system requires such fast communication and response times to ensure a timely response to the explosion. Known combined monitoring and control systems (e.g., in the fire-detection field) lack such quick communication and response times. Moreover, known fire-detection systems are subject to specific fire codes and standards (e.g., those propagated by the National Fire Protection Association), which do not apply to suppression systems. Accordingly, there has been no incentive or motivation to modify a known fire-detection system for use with a suppression system.

In one embodiment, a combined monitoring and control system may integrate monitoring of both active and passive devices into a single system. In other words, a system for monitoring and controlling a hybrid protection system is disclosed. For example, a protected volume may be provided with an active explosion suppression system as well as one or more passive explosion response mechanisms, such as, e.g., an explosion vent. Such passive explosion response mechanisms may be provided with one or more sensors, such as, e.g., an explosion vent integrity sensor. Examples of explosion vent integrity sensors are disclosed in co-owned U.S. application Ser. No. 12/388,022, the entire contents of which are expressly incorporated herein by reference. In the prior art, the integrity of a passive explosion response mechanism (e.g., an explosion vent) is monitored directly by a customer/operator or at least separately from the system that monitors and controls a separately provided active explosion suppression system. At most, a known explosion vent monitor may be used only to trigger an active suppression system in the event that the explosion vent activates and opens. According to the present disclosure, however, the combined monitoring and control system may monitor the integrity of a passive explosion response system and coordinate the response of an active suppression system even without the passive explosion response system activating. For example, the disclosed control system may sense a strain on an explosion vent and instruct the suppression system to take action (even without the explosion vent fully activating).

In one embodiment, a combined monitoring and control system may allow an operator to log into the system locally and/or remotely. It may be desirable to provide safeguards to prevent the combined monitoring and control system from be externally accessed, e.g., to ensure resistance to tampering.

In one embodiment, a combined monitoring and control system may be configured to operate under intrinsically safe electrical conditions. Such a feature may be desirable, for example, when the system is used in an environment including flammable or combustible elements.

In one embodiment, a combined monitoring and control system may include a mechanism to assign or provide for a unique address at each safety system component (e.g., Cannon™, sensor or group of sensors, vents, spark detector, etc.). The monitoring system may be configured to receive data such as: (i) a propellant pressure (either a limit witch or a transducer able to provide actual pressure value); (ii) whether sensor(s) are present and active in the system; (iii) the integrity of a Cannon™'s connection to equipment (e.g., the seal on the canister is not breached or compromised); (iv) whether an actuator circuit is in operative condition (for example, by monitoring a trickle charge through the actuator (e.g., a Metron unit) to confirm an operating condition); (v) whether a lockout mechanism in position; (vi) process pressure and/or temperature conditions from additional sensing devices, or from a transducer sensor (if used) which forms a part of the system response; and/or (vii) whether a vent is in normal operating condition (either via a simple continuity sensor like the commercially available "MBS sensor" offered by BS&B Safety Systems, via a more elaborate Vent Integrity Sensor, such as disclosed in co-owned U.S. patent application Ser. No. 13/767,311 (the entire contents of which is hereby expressly incorporated by reference), or by another suitable mechanism for sensing a vent's condition).

It is contemplated that the disclosed combined monitoring and control system may be retrofitted in a pre-existing explosion suppression system. For example, a pre-existing explosion suppression system may include sensors (e.g., pressure transducers) to generate an alarm to indicate an emergency condition. According to the present disclosure, the output from such sensors may be fed into a retrofitted monitoring and control system and used for control purposes (e.g., to initiate shut down or other protective measures). It is also contemplated that a pre-existing system may be retrofitted with additional sensors—e.g., additional temperature or pressure sensors—to generate additional signals that the newly added monitoring and control system may use to provide an appropriate response.

It is contemplated that individual features of one embodiment may be added to, or substituted for, individual features of another embodiment. Accordingly, it is within the scope of this disclosure to cover embodiments resulting from substitution and replacement of different features between different embodiments.

The above described embodiments and arrangements are intended only to be exemplary of contemplated systems and methods. Other embodiments will be apparent to those skilled in the art from consideration of the specification and practice of the disclosure herein.

What is claimed is:

1. An explosion suppression system, comprising:

a cannon comprising a barrel and a propellant tank, wherein the propellant tank contains a propellant;

a suppressant cartridge configured to be inserted into the barrel, wherein the suppressant cartridge comprises a first end configured to face the propellant tank, the first end defining a first plane at its ultimate extent;

wherein the suppressant cartridge comprises a second end configured to face an outlet of the cannon, the second end defining a second plane at its ultimate extent;

wherein no component of a detonator is positioned between the first plane and the second plane;

wherein the suppressant cartridge contains a suppressant;

wherein the suppressant cartridge is non-pressurized in preparation for propulsion from an outlet of the cannon; and, a trigger configured release propellant from the propellant tank into the barrel and suppressant cartridge when the trigger is triggered, thereby propelling suppressant from the outlet of the cannon.

2. The explosion suppression system of claim 1, wherein the suppressant cartridge comprises an outlet seal, and wherein the seal is provided with at least one line of weakness.

3. The explosion suppression system of claim 1, further comprising:

a seal actuator positioned exterior to the suppressant cartridge, the seal actuator being configured to destructively weaken or burst the outlet seal when propellant is released from the propellant tank.

4. The explosion suppression system of claim 1, further comprising:

an outlet valve configured to release suppressant from the cannon when propellant is released from the propellant tank into the barrel and suppressant cartridge.

5. The explosion suppression system of claim 1, wherein the barrel is positioned adjacent to an opening in a protected volume, the system further comprising:

a shield positioned between the barrel and the opening in the protected volume, wherein the shield is configured to isolate the outlet of the barrel from pressure changes within the protected volume.

6. The explosion suppression system of claim 1, wherein the suppressant consists of a powdered suppression agent.

7. The explosion suppression system of claim 1, wherein the suppressant consists of a liquid suppression agent.

8. The explosion suppression system of claim 1, wherein the suppressant consists of a mixed liquid and solid suppression agent.

9. The explosion suppression system of claim 1, further comprising:

a lock-out key;

wherein the lock-out key is configured to be inserted into the trigger;

wherein the lock-out key is further configured to mechanically prevent the trigger from being triggered when the lock-out key is inserted into the trigger; and wherein the lock-out key is further configured to electrically prevent the trigger from being triggered when the lock-out key is inserted into the trigger.

10. The explosion suppression system of claim 9, further comprising:

a monitor, wherein the monitor is configured to register that the explosion suppression system is disabled when the lock-out key is inserted into the trigger.

11. The explosion suppression system of claim 10, further comprising:

a lockout-tagout tag configured to prevent the lock-out key from being removed from the trigger.

12. The explosion suppression system of claim 11, wherein the lockout-tagout tag is further configured to provide an indication whether the lock-out key has been displaced.

* * * * *